(12) United States Patent
Lenchenkov

(10) Patent No.: US 12,299,946 B2
(45) Date of Patent: May 13, 2025

(54) HIGHLY EFFICIENT ACTIVE ILLUMINATION IMAGING SYSTEMS AND METHODS

(71) Applicant: SONY SEMICONDUCTOR SOLUTIONS CORPORATION, Kanagawa (JP)

(72) Inventor: Victor A. Lenchenkov, Victor, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 165 days.

(21) Appl. No.: 17/994,814

(22) Filed: Nov. 28, 2022

(65) Prior Publication Data
US 2024/0177442 A1    May 30, 2024

(51) Int. Cl.
*G06V 10/141*    (2022.01)
*G06V 10/147*    (2022.01)

(52) U.S. Cl.
CPC .......... *G06V 10/141* (2022.01); *G06V 10/147* (2022.01)

(58) Field of Classification Search
CPC .. G06V 10/141; G06V 10/147; G01S 7/4815; G01S 7/4816; G01S 17/894; H04N 23/56
See application file for complete search history.

(56) References Cited

U.S. PATENT DOCUMENTS

| 10,514,256 | B1 | 12/2019 | Kamarshi | |
|---|---|---|---|---|
| 2008/0088731 | A1 | 4/2008 | Tanaka | |
| 2008/0240185 | A1 | 10/2008 | Sai | |
| 2012/0051383 | A1 | 3/2012 | Stern | |
| 2012/0147143 | A1 | 6/2012 | Park | |
| 2013/0116049 | A1* | 5/2013 | Pellman | A63F 13/42 348/46 |
| 2014/0152791 | A1* | 6/2014 | Sarwar | G06V 40/1324 348/77 |
| 2016/0351609 | A1* | 12/2016 | Borthakur | H01L 27/14663 |
| 2017/0038459 | A1* | 2/2017 | Kubacki | G01S 17/36 |
| 2018/0070829 | A1 | 3/2018 | Iwawaki et al. | |
| 2018/0190854 | A1 | 7/2018 | Bower et al. | |
| 2020/0041618 | A1 | 2/2020 | Pelz | |
| 2020/0238389 | A1* | 7/2020 | Arimatsu | B23B 7/10 |
| 2020/0271765 | A1 | 8/2020 | Glover et al. | |

(Continued)

FOREIGN PATENT DOCUMENTS

JP    2021-025810    2/2021

*Primary Examiner* — Hung H Lam
(74) *Attorney, Agent, or Firm* — SHERIDAN ROSS P.C.

(57) ABSTRACT

Sensor methods and systems incorporating an integrated illumination or light source are provided. The sensor can include a plurality of pixels and the integrated light source. The sensor can additionally include or be associated with imaging optics. The light source operates to generate illumination light that is passed through the imaging optics towards a scene within a field of view of the sensor system. Objects within the field of view reflect light that is collected by the imaging optics and passed to at least some of the pixels. In at least some configurations, an output of the light source is located adjacent the pixels, and provides the illumination light to the imaging optics by reflecting the illumination light from at least some of the pixels. In other configurations, the light source excites pixel elements, which then produce illumination light that is provided to the imaging optics.

20 Claims, 17 Drawing Sheets

(56) References Cited

U.S. PATENT DOCUMENTS

2023/0071596 A1\* 3/2023 Wickboldt ............. G06V 10/24
2023/0254466 A1\* 8/2023 Mizuo .................. G02B 27/017
   348/51
2023/0342444 A1\* 10/2023 Hammersberg ... G06V 40/1318

\* cited by examiner

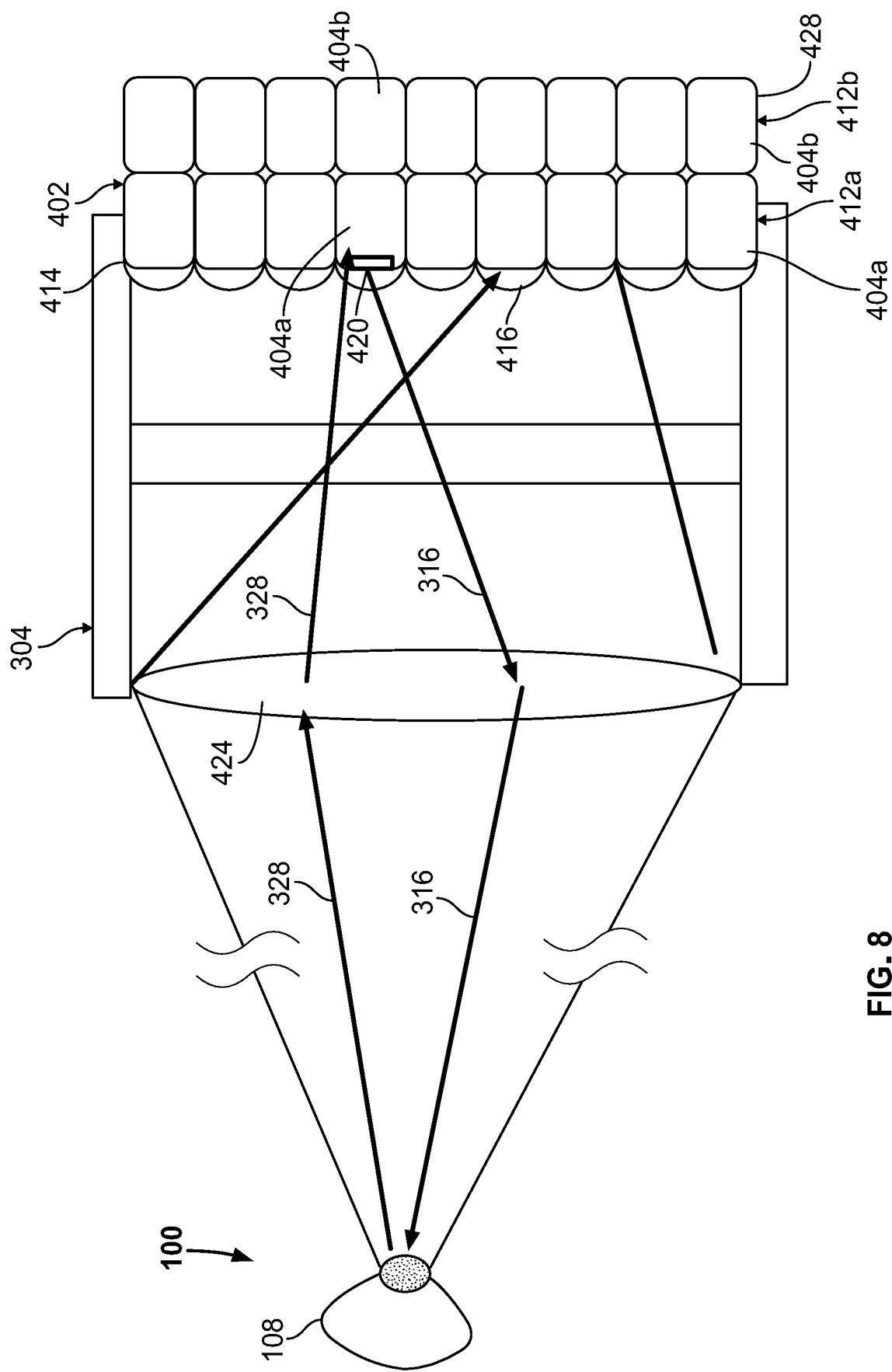

HIGHLY EFFICIENT ACTIVE ILLUMINATION IMAGING SYSTEMS AND METHODS

FIELD

The present disclosure relates to an image sensor device with an integrated active illumination system.

BACKGROUND

Image sensors, including digital image sensors, are commonly used in a variety of devices, such as scientific instruments, handheld cameras, security systems, telephones, computers, and tablets, to detect light. In a typical arrangement, light sensitive areas or pixels are arranged in a two-dimensional array having multiple rows and columns of pixels, and are operated to capture images. Each pixel generates an electrical charge in response to receiving photons as a result of being exposed to incident light. For example, each pixel can include a photodiode that generates charge in an amount that is generally proportional to the amount of light (i.e. the number of photons) incident on the pixel during an exposure period.

The ability of image sensors to produce images in low light environments is limited. One approach to enabling image capture in low light conditions is to increase the exposure period. However, even long exposure periods can be insufficient in extremely low light conditions. In addition, long exposure periods are unsuitable for imaging moving objects.

Another approach to enabling image capture in low light conditions is to provide active illumination of the scene or objects within the scene. For example, a flash or flood light mounted on or adjacent a camera incorporating the image sensor can be operated, in coordination with the exposure period of the image sensor, to enable an image to be obtained. However, such arrangements are relatively inefficient, in that the illumination light is usually more extensive in illumination period and area of coverage than is required. In addition, such supplementary lighting systems are usually relatively bulky and are often provided as separate devices from the imaging system itself.

In addition to collecting images from a scene, light based sensors can be used for other purposes. For example, light detection and ranging (lidar) systems can determine a range to an object by determining an amount of time required for a pulse of light to travel from the system, reflect off of an object, and return to the sensor. However, even though some of these systems transmit light through the telescope or other optical structure that is also used to deliver collected light to the sensor, the illumination source, often in the form of a laser, is provided apart from the image sensor. Also, additional optical elements are required to place the illumination light on a path that can utilize the telescope. These additional elements introduce inefficiencies in the delivery of the illumination light.

Accordingly, it would be desirable to provide a source of illumination for an image sensor that operated with higher efficiency than previous devices.

SUMMARY

Embodiments of the present disclosure provide image sensors and image sensing methods that include an integral illumination source to provide active illumination of a scene. More particularly, the illumination source is located close to the image plane of the image sensor. An image sensor in accordance with embodiments of the present disclosure can include a plurality of light sensitive pixels disposed within an array. The illumination source can be disposed adjacent the image sensor. In addition, the illumination source utilizes the same optical elements that operate to collect and deliver light from within a scene to the image sensor. In accordance with at least some embodiments of the present disclosure, light from the illumination source is directed towards one or more pixels of the image sensor, and then reflected to the imaging optics for delivery to the scene. Light reflected from an object in the scene is then received through the imaging optics. Illumination light reflected from a selected pixel area, directed to the scene by the imaging optics, reflected by an object in the scene, and received back through the imaging optics can be incident on the selected pixel area, due to the conjugate nature of the imaging optics.

In accordance with at least some embodiments of the present disclosure, the image sensor includes pixels that operate to generate charge in response to receiving photons collected through the imaging optics. As examples, the pixels can be configured as an array of photodiodes or organic photoelectric devices disposed within an imaging plane. Moreover each of the pixels may be associated with a micro lens. In addition, some or all of the pixels may be associated with a color filter or polarization selective surface, to enable the selection of the color and/or polarization of light collected from a scene.

The illumination source can be configured as a light source provided adjacent or near an imaging plane of the image sensor. For example, the illumination source can be disposed behind a cover glass element extending over the pixel array. The light source can be provided as a light emitting diode, laser, or other source of photons, that is itself disposed adjacent to the pixel array. Alternatively or in addition, the light source can include an optical fiber, aperture, lens, or other optical structure that allows photons produced by a light emitting diode, laser, or other source of photons that is not disposed immediately adjacent the image sensor to be delivered to some or all of the pixels of the pixel array. In accordance with at least some embodiments of the present disclosure, illumination light emitted by the light source is reflected by one or more of the image sensor pixels toward the scene. In accordance with other embodiments of the present disclosure, the light source operates to induce the emission of illumination light from the pixels themselves. In accordance with still other embodiments of the present disclosure, pixels within the pixel array are operated to produce the illumination light. For example, the image sensor can include pixels that are operated in a first mode to provide illumination of a scene, and that are then operated in a second mode to detect light collected from the scene. In any of the various configurations, the illumination light is passed through the same imaging lens that is used to collect light from the scene.

Image sensing methods in accordance with embodiments of the present disclosure include producing illumination light near an image sensor pixel array. In accordance with embodiments of the present disclosure, the illumination light is reflected from some or all of the pixels within the pixel array of the image sensor, and through imaging optics to illuminate a scene. In accordance with other embodiments of the present disclosure, illumination light can be provided by directing excitation light received from an illumination source towards pixels included in the pixel array, which absorb and re-emit illumination light. In accordance with still other embodiments of the present disclosure, providing illumination light includes operating pixels capable of emitting light in a light-emitting mode, and then detecting light collected from the scene, including illumination light that has been reflected from an object within the scene, by operating those pixels in a light detecting mode.

Additional features and advantages of embodiments of the present disclosure will become more readily apparent from the following description, particularly when considered together with the accompanying drawings.

BRIEF DESCRIPTION OF THE DRAWINGS

FIG. 8 is a schematic depiction of portions of an imaging system with integrated active illumination in accordance with other embodiments of the present disclosure;

DETAILED DESCRIPTION

Figure 1:
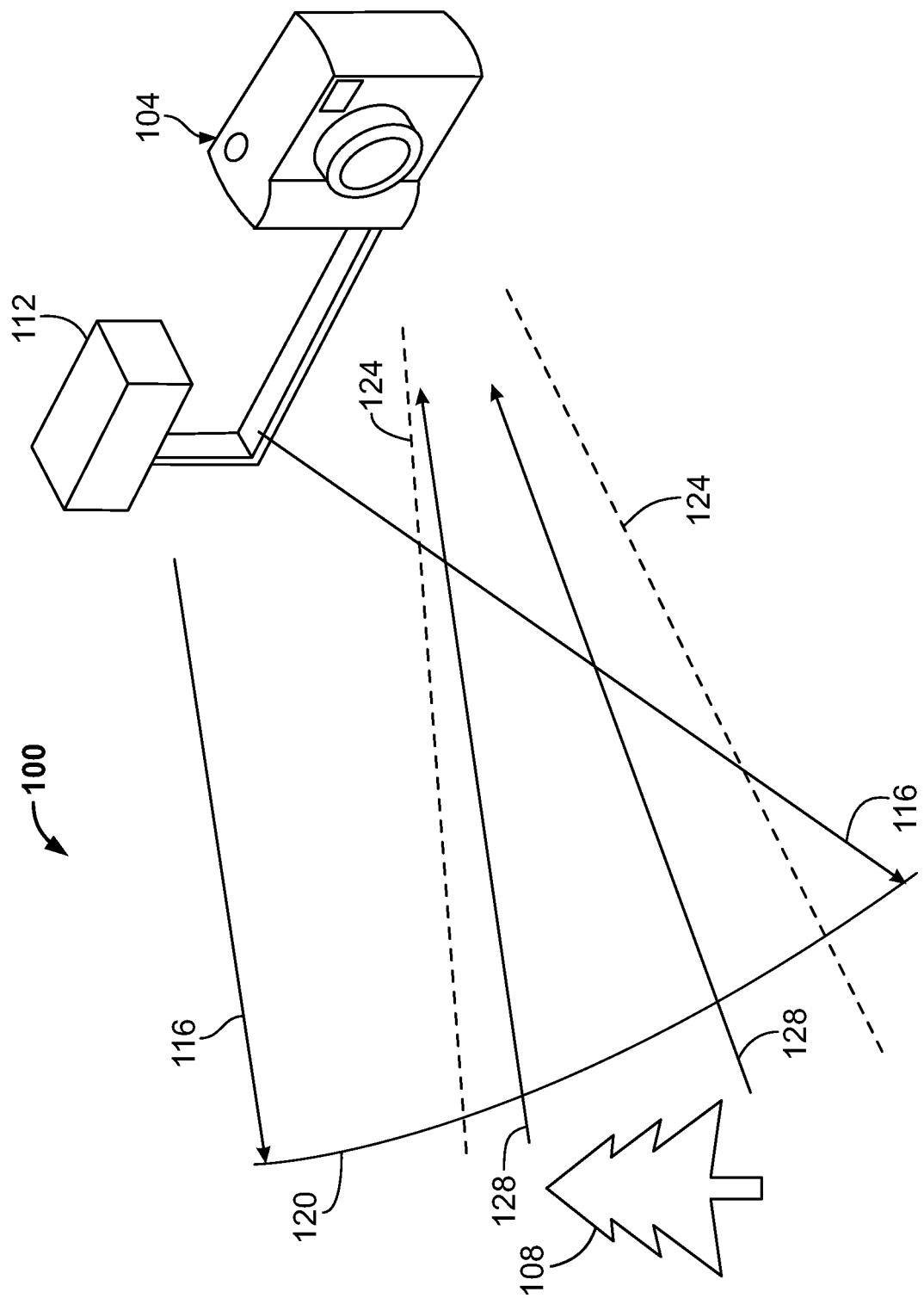
FIG. 1 depicts a scene in which active illumination is used in connection with obtaining an image in accordance with the prior art.

FIG. 1 depicts a scene 100 in which active illumination is used in connection with obtaining an image in accordance with the prior art. More particularly, in this example, an imaging system 104 in the form of a camera incorporating an image sensor is shown in position to obtain an image of a scene 100 containing an object or area of interest 108. The imaging system 104 is operated in conjunction with a light source 112, in this example an offboard flash unit. Operation of the imaging system 104 and the light source 112 is coordinated such that the light source 112 produces illumination light 116 during an exposure period of the imaging system 104. As depicted in the figure, the illumination light 116 is dispersed over a relatively wide area 120, and diminishes with distance from the light source 112. In addition, the area 120 over which the illumination light 116 is provided is wider than the field of view 124 of the imaging system 104. Moreover, the field of view 124 of the camera 104 is wider than an area of the scene 100 occupied by the object or area of interest 108 from which light 128 is reflected. Accordingly, various inefficiencies in connection with the illumination of an object 108 within a scene 100 using a light source 112 that is external to an imaging system 104 are present in this prior art arrangement.

Figure 2:
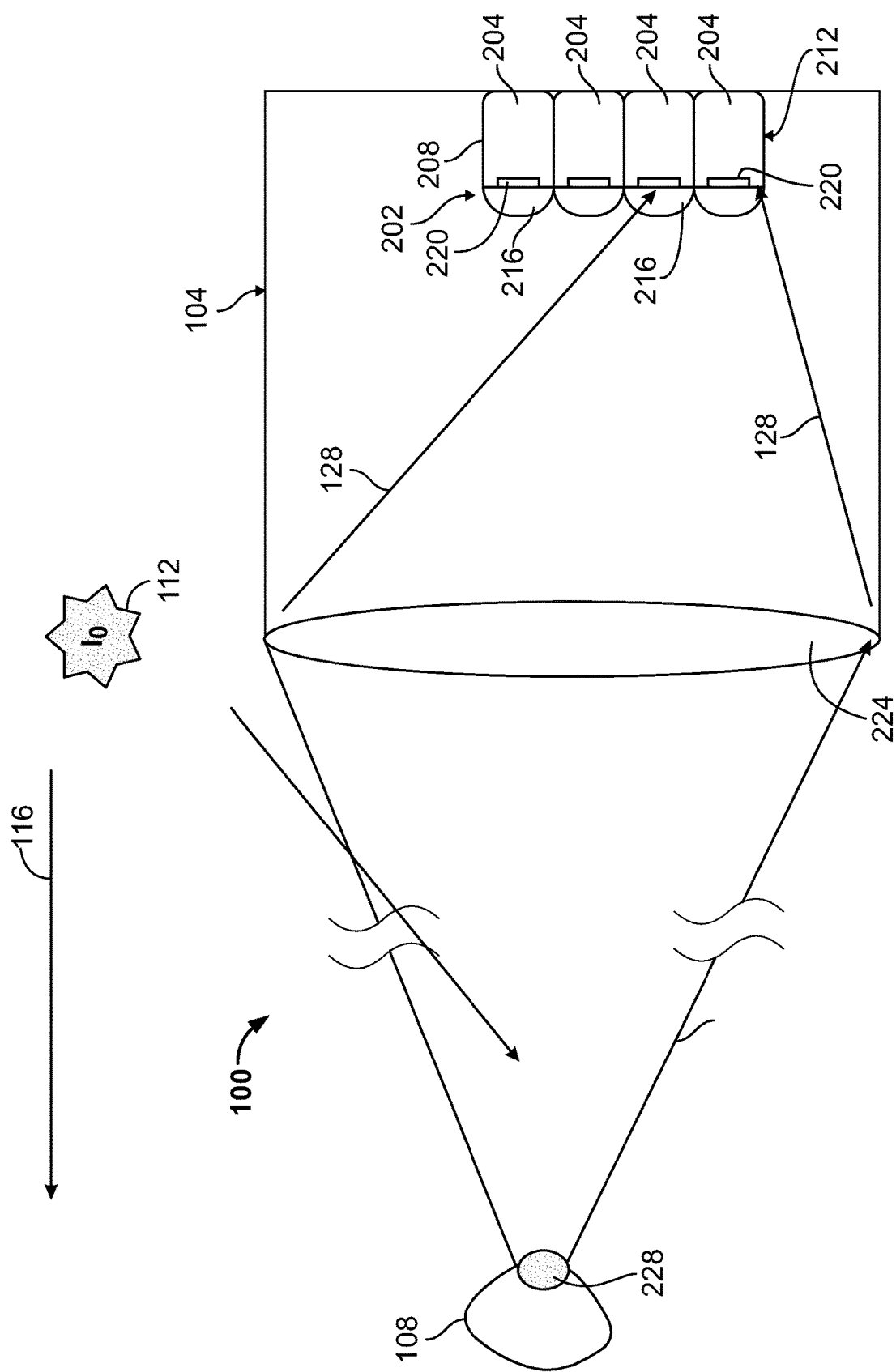
FIG. 2 is a schematic depiction of a prior art imaging system and active illumination in accordance with the prior art.

With reference now to FIG. 2, portions of an imaging system 104 and an associated external light source 112, in accordance with the prior art, are depicted relative to an object 108 within a scene 100. As illustrated in the figure, and as can be appreciated by one of skill in the art, the imaging system 104 can include an image sensor 202 having a plurality of pixels 204 formed in a sensor substrate 208 and disposed within a two-dimensional array 212. Each pixel 204 can be associated with a micro lens 216 and a color filter 220. Light 128 from within the scene 100 is collected by imaging optics 224 and directed to pixels 204 within the array 212. As depicted in the figure, the light 128 reflected from an object point or selected area 228 associated with the object 108 is incident on a subset of the pixels 204 within the array 212.

Figure 3A:
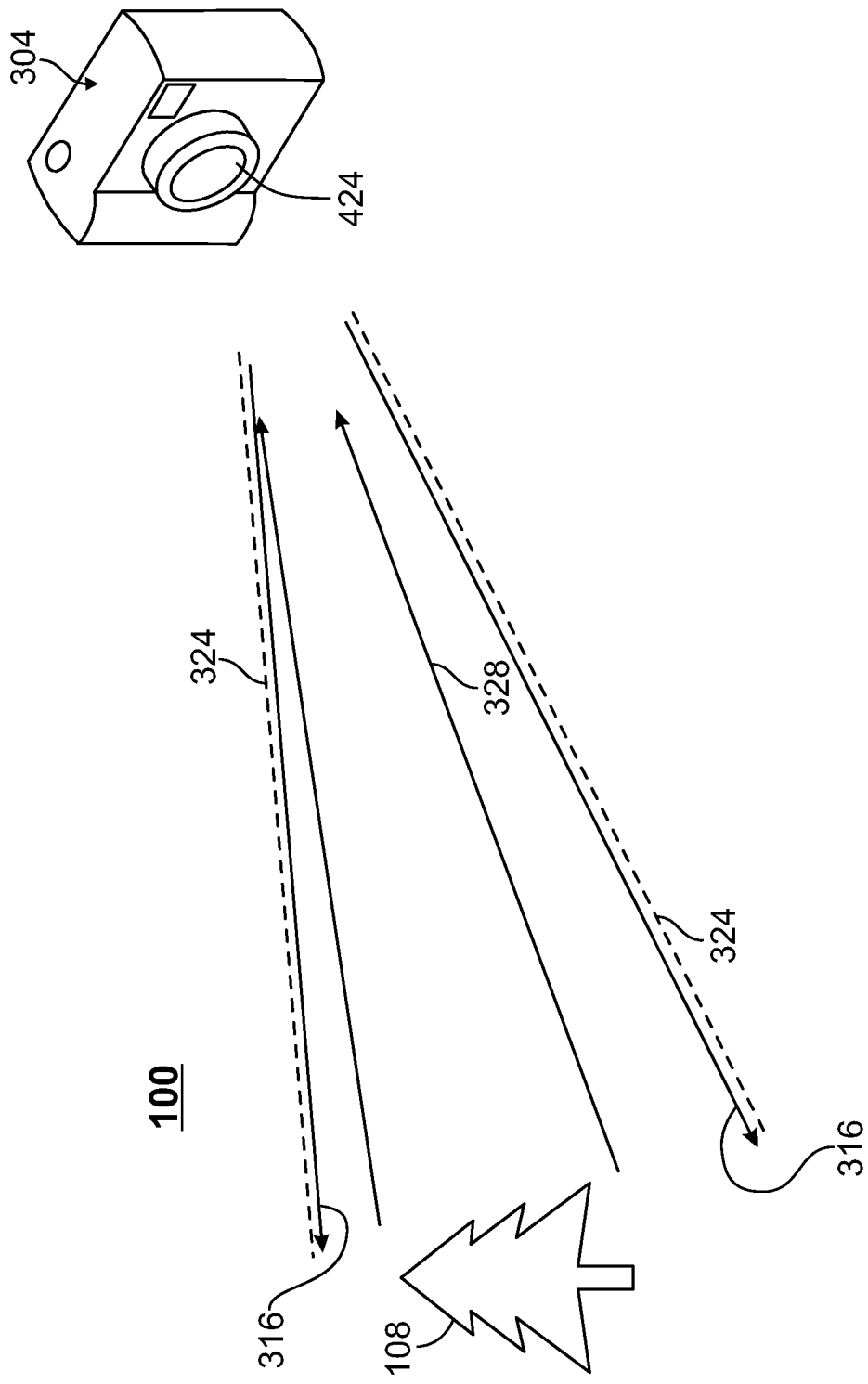
FIGS. 3A and 3B depict scenes in which active illumination is used in connection with obtaining an image in accordance with embodiments of the present disclosure.
Figure 3B:
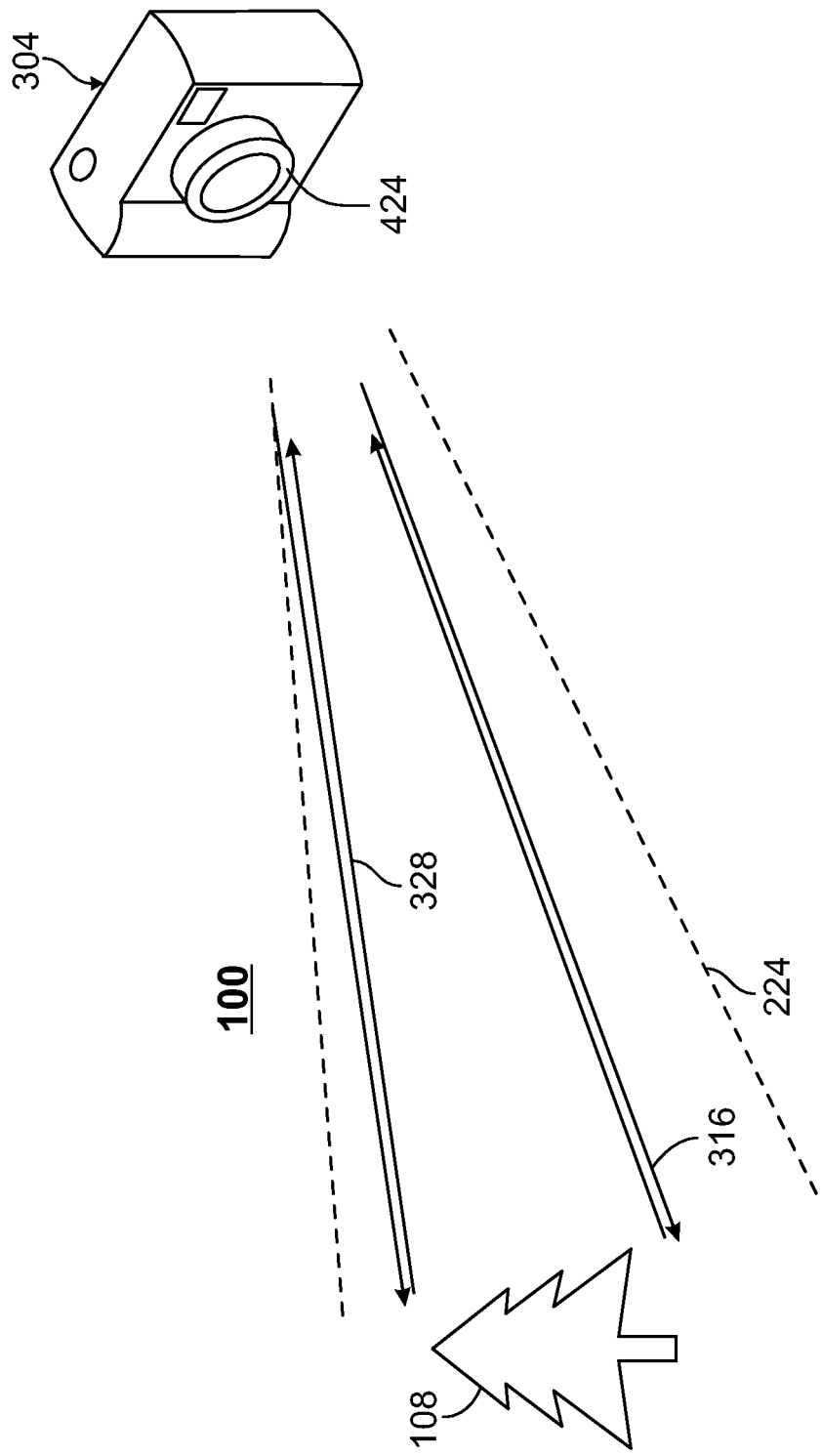

FIGS. 3A and 3B depict examples of active illumination of a scene 100 using systems and methods in accordance with embodiments of the present disclosure. In both of these examples, an imaging system 304 in the form of a camera incorporating an image sensor is shown in position to obtain an image of a scene 100 containing an object or area of interest 108 by collecting light 328 reflected from an object or objects 108 within the scene 100. Also in both of these examples, the imaging system 304 is operated in conjunction with a light source 428 (see FIG. 4) that is integral to the imaging system 304. Although depicted in various examples as a camera, it should be appreciated that an imaging system 304 in accordance with embodiments of the present disclosure is not limited to such a configuration. Instead, an imaging system 304 as described herein can be incorporated into any system, device, or method in which the efficient illumination of objects external to the imaging system is required or desired.

In the scenario depicted in FIG. 3A, illumination light 316 generated by the light source 428 is passed through imaging optics 424 provided as part of the imaging system 304 and delivered over an area of the scene 100 that is coextensive with the field of view 324 of the imaging system 304. Accordingly, it can be appreciated that embodiments of the present disclosure enable illumination light to be delivered within an area that is the same as or similar to (e.g. ±5%) of an area encompassed by a field of view 324 of an imaging system 304. Accordingly, embodiments of the present disclosure can utilize illumination light more efficiently than systems utilizing light sources that are not integral to the imaging system.

In the scenario depicted in FIG. 3B, illumination light 316 generated by the light source 428 is again passed through the imaging optics 424 provided as part of the imaging system 304, but in this example the illumination light is delivered within a partial portion or sub area of the full area encompassed by the field of view 324 of the imaging system 304. Accordingly, embodiments of the present disclosure enable illumination light to be concentrated within selected areas, for example areas corresponding to objects 108, within a scene 100, thereby enabling even more efficient use of illumination light.

Figure 4:
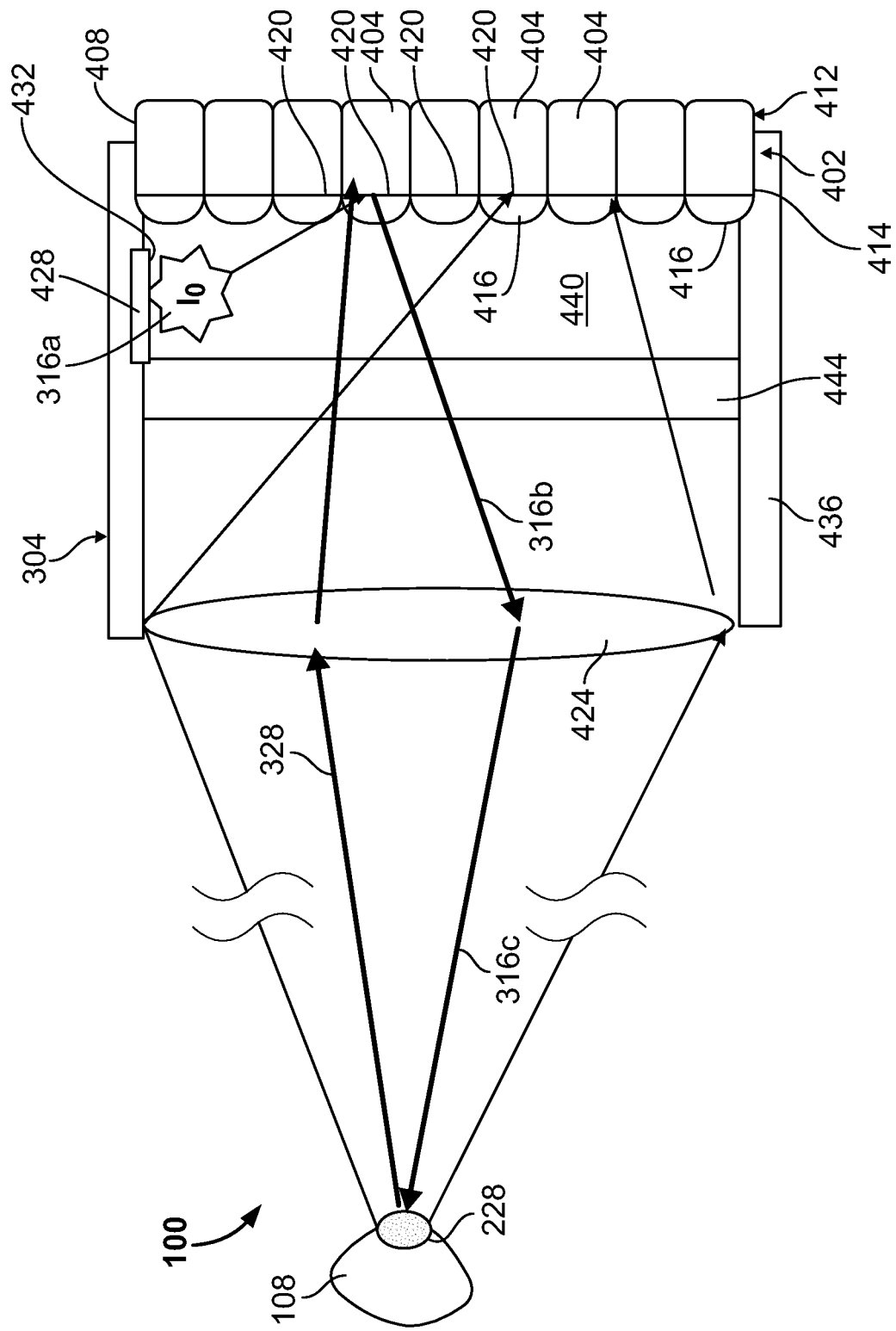
FIG. 4 is a schematic depiction of portions of an imaging system with integrated active illumination in accordance with embodiments of the present disclosure.

With reference now to FIG. 4, portions of an imaging system 304 having an integrated light source 428 in accordance with embodiments of the present disclosure are depicted relative to an object 108 within a scene 100. In this embodiment, the imaging system 304 can include an image sensor 402 having a plurality of pixels 404 formed in a sensor substrate 408 and disposed within a two-dimensional pixel array 412 located at an image plane 414 of the system. Each pixel 404 can be associated with a microlens 416 and a color filter 420. Accordingly, at least some aspects of an image sensor 402 included in embodiments of the present invention can be the same as or similar to an image sensor 202 of a conventional imaging system 104. In accordance with embodiments of the present disclosure, and as depicted in FIG. 4, the microlenses 416 can be provided as refractive elements. In accordance with other embodiments of the present disclosure, the microlenses 416 can be provided as diffractive elements.

In addition, an imaging system 304 in accordance with embodiments of the present disclosure includes an integrated light source 428 with at least an output or output surface 432 that is located adjacent to the pixel array 412. The light source 428 can include any source of photons, such as but not limited to a light emitting diode source, a laser source, a quantum dot material source, a fluorescent source, or an incandescent source. In the example of FIG. 4, the light source 428 as well as the output 432 are located adjacent the pixel array 412, within an imaging system package 436, for example in the form of an enclosure, that serves as a structure interconnecting various components of the imaging system 304, such as but not limited to the image sensor 402, the illumination source 428, and the imaging optics 424. Together, the imaging package 436, the image sensor 402, and the imaging optics 424 define an imaging volume 440. The imaging system 304 can also include a cover glass 444 disposed between the image sensor 402 and the imaging optics 424. Where a cover glass 444 is included, the imaging volume 440 is defined by the imaging package 436, the image sensor 402, and the cover glass 444. Moreover, in this example, the light source 428 and the associated output 432 are located within the imaging volume 440. As discussed in greater detail elsewhere herein, some or all of the pixels 404 can also include a reflector for reflecting light from a light source, or an emitter, for instance in the form of a fluorescent layer or a quantum dot layer, for emitting light in response to excitation light received from a light source 428.

In accordance with the least some embodiments of the present disclosure, pixels 404 configured as optical black pixels can be included in the pixel array 412. In accordance with further embodiments of the present disclosure, optical black pixels can be provided laterally adjacent or behind imaging pixels 404. As can be appreciated by one of skill in the art, an optical black pixel is typically configured identically to an imaging pixel, except that it is blocked from receiving light. In accordance with embodiments of the present disclosure, by including optical black pixels within the pixel array 412, parasitic signals that may be present in the imaging pixels as a result of exposure to the illumination light 316 can be detected and subtracted from signals generated by the imaging pixels 404 during an imaging operation.

As can be appreciated by one of skill in the art, optical systems have a conjugate property in which an image point (i.e. a point on an image plane, for example formed by a pixel array 412) has a 1 to 1 correspondence with an object point (i.e. a point in a scene). Embodiments of the present disclosure take advantage of this property to efficiently produce active illumination of a scene or areas within a scene by introducing illumination light 316 on an image sensor 402 side of the imaging optics 424. In accordance with at least some embodiments of the present disclosure, the illumination light 316 generated by the light source 428 is delivered to the imaging optics 424 by first reflecting that light off of pixels 404 located within the image plane 414. In operation, the light source 428 can be operated to generate illumination light 316 that is directed towards the scene 100, in order to illuminate objects 108 within the scene 100. More particularly, illumination light 316 generated by the light source 428 is passed from the output surface 432 along a first segment of illumination light 316*a* and towards at least some of the pixels 404 included in the pixel array 412. For instance, the output 432 can disperse the illumination light within the first segment 316*a* across all of the pixels 404 within the array 412. As another example, the output 432 can disperse the illumination light within the first segment 316*a* across pixels 404 within a selected area or areas of the array 412, so as to direct the illumination light 316 to a corresponding area or areas of the scene 100. The pixels 404 reflect the received light along a second segment 316*b*, through the cover glass 444 and towards the imaging optics 424. For example, as discussed in greater detail elsewhere herein, the pixels 404 can include a reflector structure to direct the received illumination light 316 towards the imaging optics. The imaging optics 424 direct the received light along a third segment of illumination light 316*c*. Accordingly, the illumination light is directed by the imaging optics 424 to the area within the field of view 324 of the imaging system 104. Light 328 reflected from within the field of view 324 of the imaging system 304 is collected by the imaging optics 324 and directed to the pixel array 412. Signals generated by the pixels 402 within the pixel array 412 in response to receiving the reflected light 328 can then be processed and used to discern information from the scene, including but not limited to forming an image of the scene 100.

In accordance with other embodiments of the present disclosure, the illumination light 316 that is directed towards the scene 100 by the imaging optics 424 is a result of an emission from some or all of the pixels 404 that is stimulated by light received from the light source 428. Accordingly, as discussed in greater detail elsewhere herein, the pixels 404 can include an emitter in the form of a fluorescent layer or a quantum dot structure. More particularly, the light source 428 can be operated to generate illumination light 316*a* that is directed towards the some or all of the pixels 404. In response to receiving the illumination light 316*a* of a first wavelength, pixels 404 that incorporate a fluorescent layer re-emit light at a second wavelength. Where the pixels 404 incorporate photoluminescent quantum dot structures, they can be stimulated to emit light by exposing them to the illumination light 316*a* received from the light source 428. The light re-emitted or emitted from the pixels 404 is passed as illumination light 316*b* to the imaging optics 424. As in other embodiments, the pixels 404 from which illumination light 316 is passed to the imaging optics 424 can be selected so that the illumination light 316 is only directed to selected areas of the scene 100.

Figure 5:
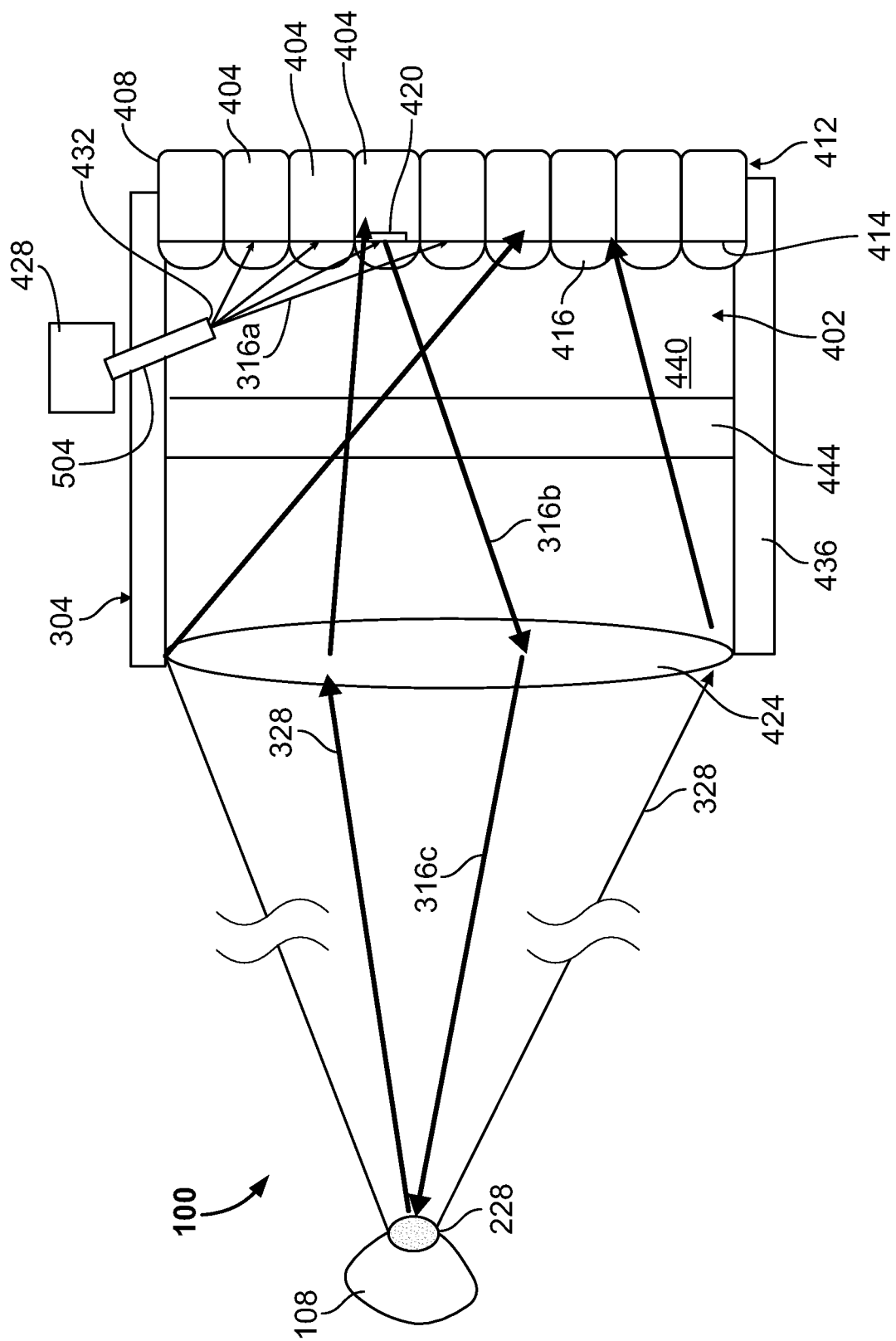
FIG. 5 is a schematic depiction of portions of an imaging system with integrated active illumination in accordance with other embodiments of the present disclosure.

In FIG. 5, portions of an imaging system 304 having an integrated light source 428 in accordance with other embodiments of the present disclosure are depicted relative to an object 108 within a scene 100. In this embodiment, the imaging system 304 is configured the same as or similar to the embodiment depicted in FIG. 4, except that in this example the light source 428 is located outside of the imaging volume 440. However, the output 432 of the light source 428 is disposed within the imaging volume 440, and illumination light generated by the light source 428 is introduced through an illumination light conduit 504 that extends into the imaging volume 440. As examples, but without limitation, the illumination light conduit 504 can be provided as an optical fiber having a first or input end at or adjacent the light source 428 and a second end within the imaging volume 440. As another example, the illumination light conduit 504 can be configured as an aperture formed in the imaging package 436. In accordance with the least some embodiments, the output 432 is associated with or is itself configured as an optical element, such as a lens, mirror, diffraction grating, or the like.

An imaging system 304 in accordance with this additional embodiment passes illumination light generated by the light source 428 into an interior of the illumination volume 440 by directing that generated light to the illumination light conduit 504. The illumination light conduit 504 then delivers the illumination light to the imaging volume 440, and in particular onto a first illumination light segment 316a, from the associated output 432. The illumination light in the first illumination light segment 316a is directed towards at least some of the pixels 404 included in the pixel array 412. The pixels 404 having illumination light 316 incident thereon reflect that light onto a second illumination light segment 316b, through the cover glass 444 and towards the imaging optics 424, which direct that light along a third segment of illumination light 316c, and into areas of the scene 100 within the field of view 324 of the imaging system 304. Light reflected from within the field of view 324 of the imaging system 304 is collected by the imaging optics 324 and directed to the pixel array 412. Signals generated by the pixels 402 within the pixel array 412 in response to receiving the reflected light 328 can then be processed and used to discern information from the scene, including but not limited to forming an image of the scene 100. Alternatively, the pixels can include fluorescent or quantum dot layers that are caused to re-emit or emit light in response to receiving stimulation light from the light source 428.

Figure 6:
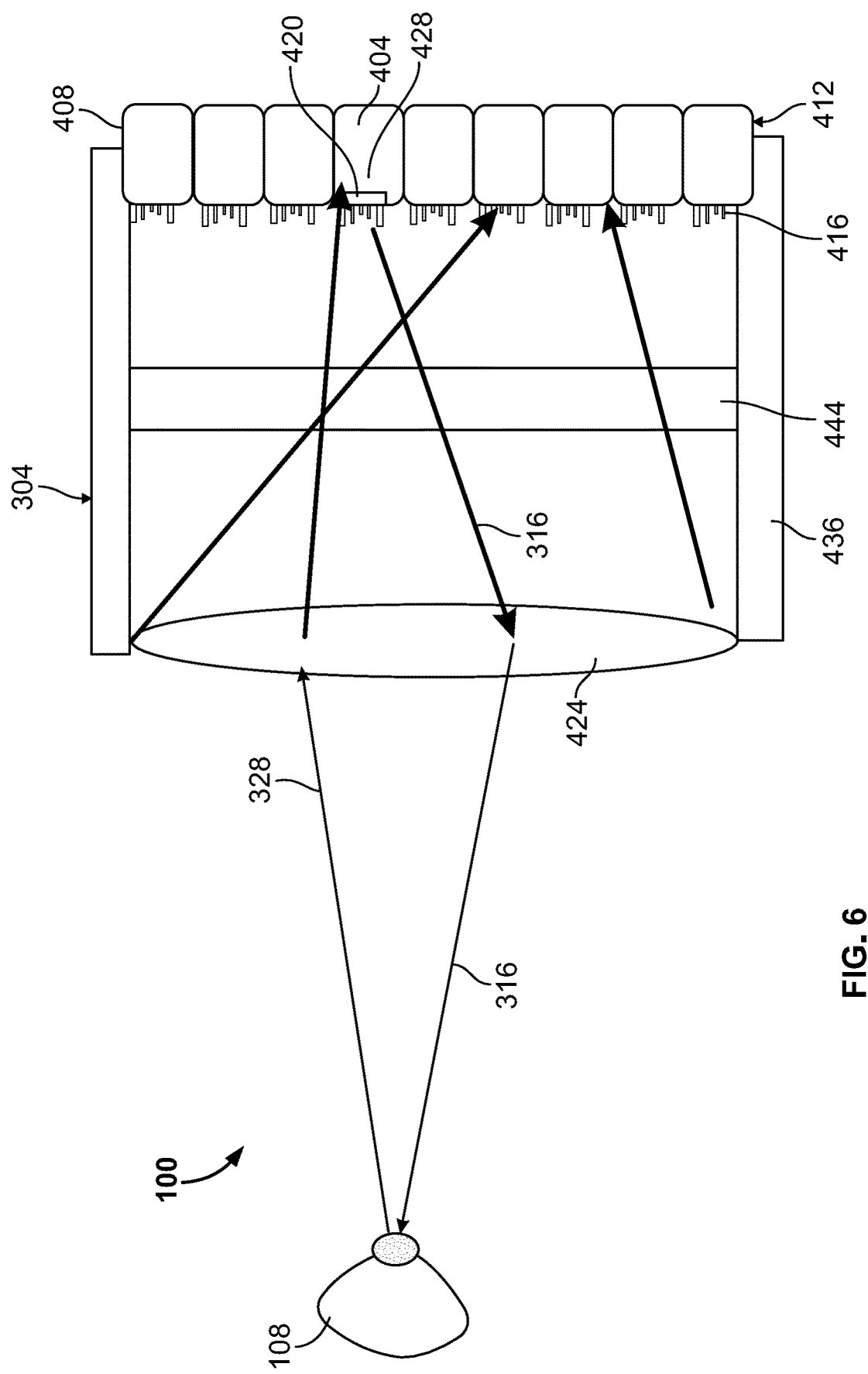
FIG. 6 is a schematic depiction of portions of an imaging system with integrated active illumination in accordance with other embodiments of the present disclosure.

FIG. 6 depicts portions of an imaging system 304 having an integrated light source 428 in accordance with still other embodiments of the present disclosure relative to an object 108 within a scene 100. In this embodiment, some or all of the pixels of the image sensor 402 incorporate an emitter-detector pixel array 412, in which the pixels 404 include quantum dot pixels configured with electroluminescent, dual purpose pixels. Accordingly, the light source 428 is part of the pixel array 412. In other respects, the imaging system 304 this embodiment can be the same as or similar to other embodiments. For example, the pixels 404 can each be associated with a microlens 416 (depicted as a set of diffractive elements in this example, although, as in other embodiments, a microlens 416 can be provided as either a refractive or diffractive elements). In addition, some or all of the pixels can be associated a color filter 420.

In a variant of this embodiment including quantum dot pixels 404, in a first mode the pixels 404 are operated to emit illumination light 316, while in a second mode the pixels 404 are operated to sense received light. Accordingly, no light source outside of the pixel array 412 needs to be provided. Instead, illumination light 316 generated by the pixels 404 themselves, while operating in the first mode, is passed to the imaging optics 424 for delivery to the scene 100. The pixels 404 are then operated in the second mode, to detect reflected light 328 collected by the imaging optics 424 and returned to the pixels 404. In accordance with embodiments of the present disclosure, all or some of the pixels 404 can be operated to generate illumination light 316. For example, all of the pixels 404 can be operated to generate illumination light 316 where maximum illumination across the entire field of view 324 of the imaging system 304 is desired. As another example, less than all of the pixels 404, in a set evenly distributed across the pixel array 412, can be operated, where less than maximum illumination across the entire field of view 324 of the imaging system 304 is desired. As yet another example, pixels 404 within a selected area or areas of the pixel array 412, corresponding to a selected area or areas within the scene 100, can be operated, where only selected areas of the scene 100 are of interest.

Figure 7A:
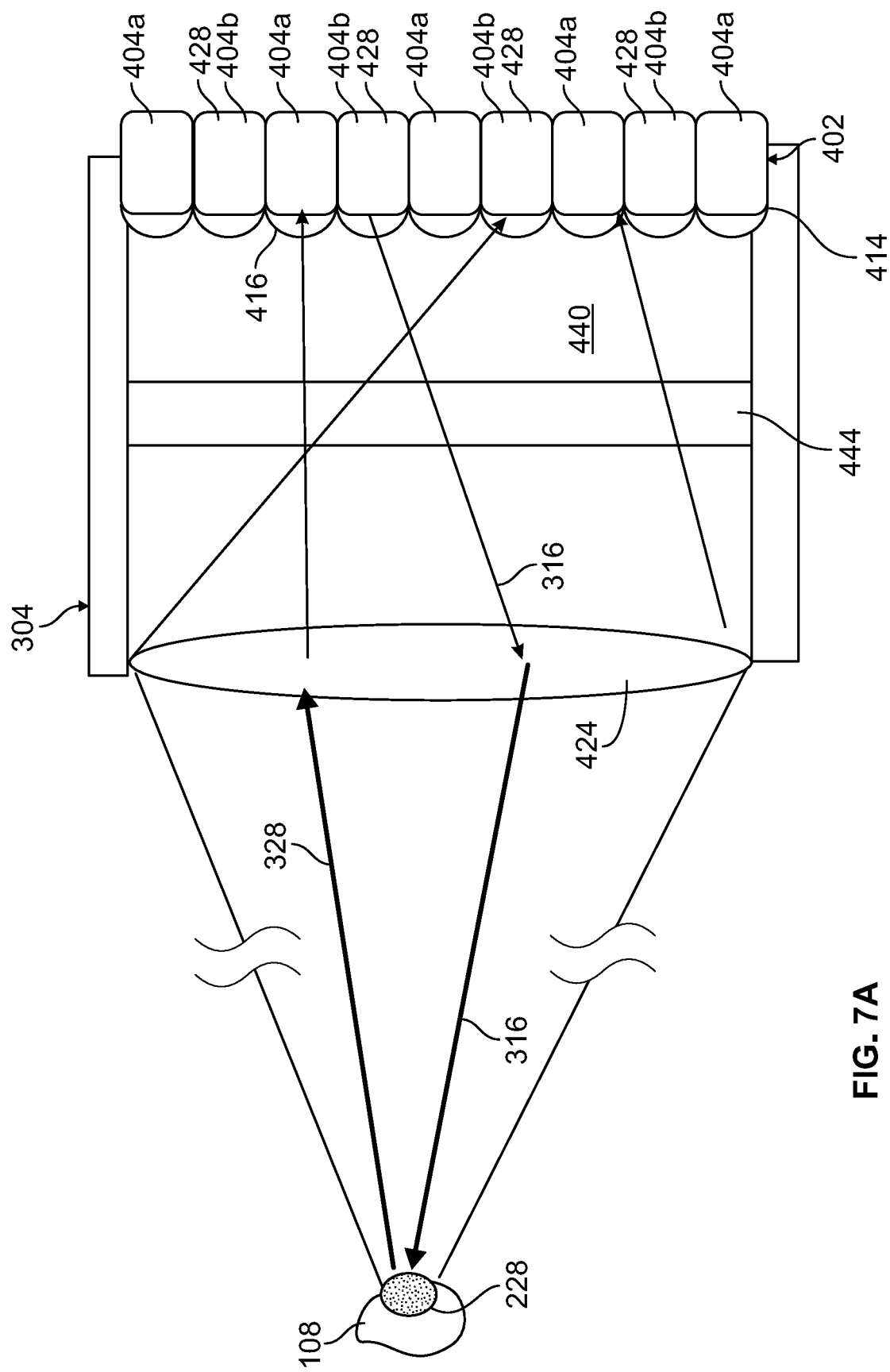
FIG. 7A is a schematic depiction of an portions of an imaging system with integrated active illumination in accordance with other embodiments of the present disclosure.
Figure 7B:
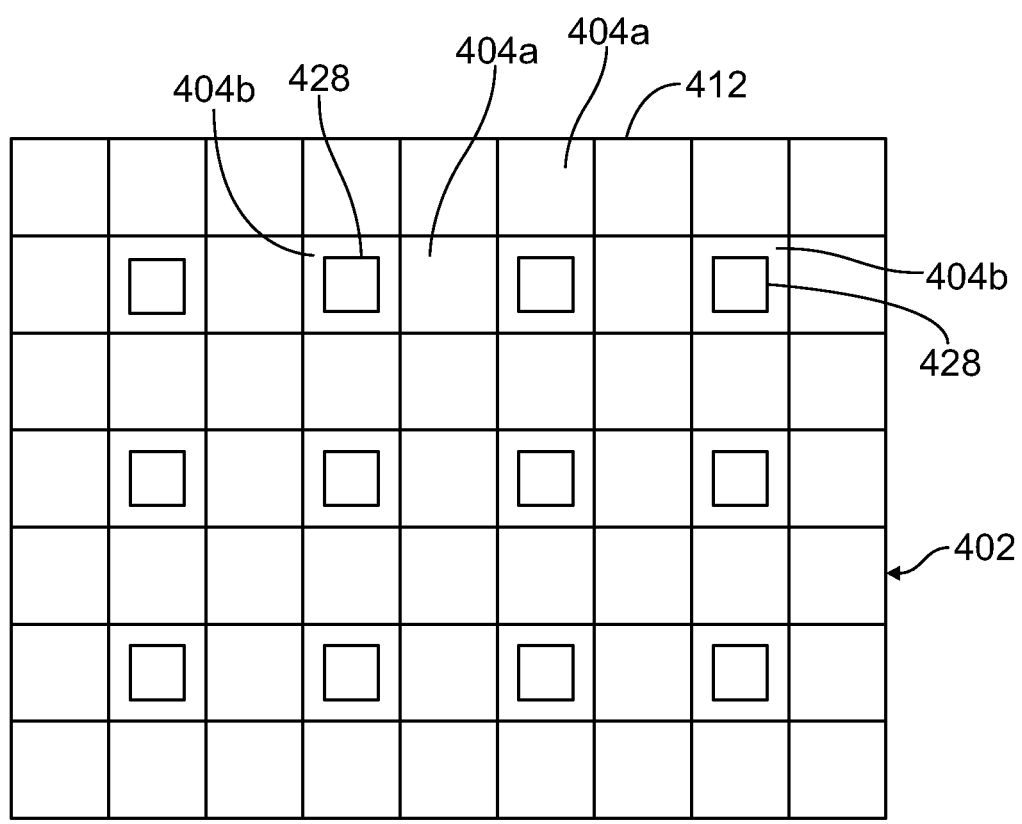
FIG. 7B is a plan view of an image sensor included in an imaging system in accordance with embodiments of the present disclosure.

With reference now to FIG. 7A, portions of an imaging system 304 having an integrated light source 428 in accordance with still other embodiments of the present disclosure are depicted relative to an object 108 within a scene 100. In this embodiment, the imaging system 304 can include an image sensor 402 having a plurality of sensor pixels 404a, and a plurality of light emitting pixels or elements 404b that function as the light source 428. As illustrated in FIG. 7B, which depicts a pixel array incorporating light-emitting elements 404b in addition to sensor pixels 404a in a plan view, the light-emitting elements 404b can be disposed intermittently among the sensor pixels 404a of the pixel array 412. In the illustrated example, the light-emitting elements 404b are disposed at regular intervals within the pixel array 412. However, other arrangements are possible. For example, light-emitting elements 404b can be disposed more densely towards a center of the pixel array 412, and more sparsely towards a periphery of the pixel array 412. In such an embodiment, no light source 428 outside of the pixel array 412 needs to be provided. Instead, illumination light 316 generated by the light-emitting elements 404b disposed within the pixel array 412 and collectively operating as the light source 428 is passed to the imaging optics 424 for delivery to the scene 100. Light 328 reflected from an object 108 within the scene and collected by the imaging optics 424 is then returned to the pixel array 412, where it is sensed by sensor pixels 404a. As can be appreciated by one of skill in the art after consideration of the present disclosure, all or less than all of the light-emitting elements 404b can be operated to produce illumination light 316. For example, whether selected light-emitting elements 404b are operated can be determined based on desired illumination levels, or areas within the scene 100 in which illumination is desired.

With reference now to FIG. 8, portions of an imaging system 304 having an integrated light source 428 in accordance with still other embodiments of the present disclosure are depicted relative to an object 108 within a scene 100. In this embodiment, the imaging system 304 can include an image sensor 402 having a plurality of sensor pixels 404a disposed in a first pixel array 412a, and a plurality of light emitting pixels or elements 404b disposed in a second pixel or element array 412b positioned directly behind the first array 412a that collectively provide the light source 428. In other respects, the imaging system 304 this embodiment can be the same as or similar to other embodiments. For example, the pixels 404 can each be associated with a microlens 416 (depicted as a set of refractive elements in this example, although, as in other embodiments, a microlens 416 can be provided as either a refractive or diffractive elements). In addition, some or all of the pixels can be associated a color filter 420.

In the embodiment depicted in FIG. 8, some or all of the light-emitting elements 404b disposed in the second array 412b can be operated to generate illumination light 316 and thus operate as the light source 428. More particularly, light generated by a light-emitting element 404b is passed through a corresponding sensor pixel 404a to the imaging optics 424 for delivery to the scene 100. Light 328 reflected from an object 108 within the scene and collected by the imaging optics 424 is then returned to sensor pixels 404a in the first array 412a. All of the light-emitting elements 404b can be operated to generate illumination light where maximum illumination across the entire field of view 324 of the imaging system 304 is desired. As another example, less than all of the light-emitting elements 404b, in a set evenly distributed across the second array 412b, can be operated, where less than maximum illumination across the entire field of view 324 of the imaging system 304 is desired. As yet another example, light-emitting elements 404b within a selected area or areas of the second array 412b, corresponding to a selected area or areas within the scene 100, can be operated, where only selected areas of the scene 100 are of interest.

Figure 9A:
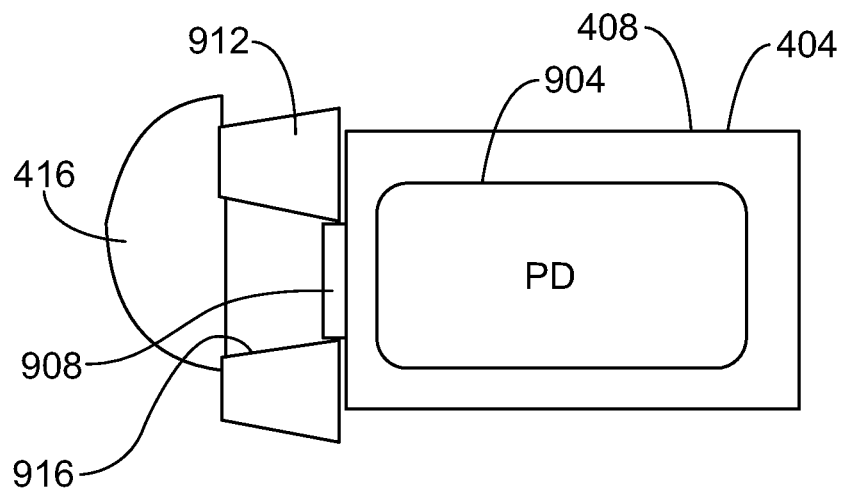
FIGS. 9A and 9B are cross sectional views of pixels incorporating a reflector structure in accordance with embodiments of the present disclosure.
Figure 9B:
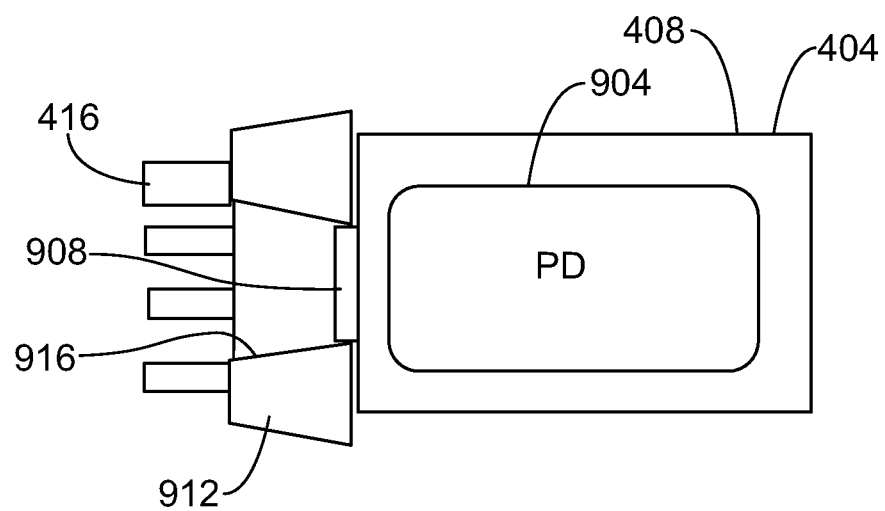

With reference now to FIGS. 9A and 9B, aspects of pixels 404 incorporating a reflector structure 908 and configured for operation in connection with embodiments of the present disclosure incorporating an integrated light source 428 having an output 432 adjacent to the pixel array 412 are depicted in cross-section views. As examples, but without limitation, pixels 404 such as those illustrated in FIGS. 9A and 9B can be applied in connection with various embodiments of the present disclosure, including those illustrated in FIGS. 4 and 5. As shown in the figures, the illustrated variants are the same, except that the pixel shown in FIG. 9A includes a refractive microlens 416, while the pixel shown in FIG. 9B includes a diffractive microlens 416. Otherwise, elements of the illustrated pixels 404 are the same or similar, and thus the following description will apply to both, unless otherwise indicated. The pixel 404 generally includes a photoelectric conversion structure 904 formed in the sensor substrate 408 that emits electrons in response to exposure to light. In the illustrated examples, the photoelectric conversion structure 904 is depicted as a photodiode. However, as can be appreciated by one of skill in the art after consideration of the present disclosure, different pixel configurations are possible. For example, a pixel 404 photoelectric conversion structure 904 can be configured as a photodiode in combination with an organic photo sensor, an organic photo sensor, or any other structure capable of generating charge in response to exposure to light.

A reflector structure 908 is disposed at or adjacent a light receiving surface of the photoelectric conversion structure 904. The reflector structure 908 can be configured as a partially reflective mirror. In accordance with the least some embodiments of the present disclosure, the reflector structure 908 is formed by disposing one or more layers of material on top of the sensor substrate 408. For example, where the sensor substrate 408 is formed from silicon, a layer of silicon dioxide can be disposed on a light receiving surface of the sensor substrate 408, to form a partial reflector, thereby forming the reflector structure 908. As another example, the reflector structure 908 can be provided as a polarization sensitive reflector. As can be appreciated by one of skill in the art after consideration of the present disclosure, a polarization sensitive reflector transmits different amounts of light depending on a shape of an object 108 reflecting light 328 back to the pixel 404. As an example, but without limitation, a reflector structure 908 in accordance with embodiments of the present disclosure can be configured so as to reflect 30% to 70% of light incident on the pixel 404.

The pixel 404 can additionally include an aperture structure 912. In accordance with embodiments of the present disclosure, the aperture structure 912 can be disposed adjacent the light receiving surface of the sensor substrate 408, and can define an aperture 916 that operates to limit the range of angles over which light 316a or 328 incident on the pixel 404 is received, or over which illumination light 316b reflected by the reflector structure 908 is provided to the imaging optics 424. The reflector structure 908 can be disposed within the aperture 916. In accordance with other embodiments of the present disclosure, the reflector structure 908 can be disposed between the aperture structure 912 and the light incident surface of the sensor substrate 408. As an example, but without limitation, the aperture structure 912 can be formed from a layer of metal or from a layer of low refractive index material disposed on the light incident side of the sensor substrate 408.

The microlens 416 can be disposed across a light incident surface of the aperture structure 912. In addition, the microlens 416 location can be shifted relative to a centerline of the pixel 404, and/or the microlens 416 shape can be modified (e.g. in plan view a refractive microlens 416 can be elliptical rather than circular, while a structure of a diffractive microlens 416 can be altered as compared to the microlens 416 associated with a pixel 404 in a different location of the pixel array 412), dependent on a particular location of the pixel 404 within the pixel array 412, to accommodate a specific chief ray angle. More particularly, the configuration of the microlens 416 and of the aperture 916 can be selected to ensure that illumination light 316 reflected by the reflector structure 908 is provided to the imaging optics 424 within a selected cone or area. In addition, and as can be appreciated by one of skill in the art after consideration of the present disclosure, a system 104 in accordance with embodiments of the present disclosure enable a 1:1 correspondence between image points (points or pixels 404 within the pixel array 412) and object points 228. Accordingly, in embodiments in which illumination light 316 is reflected from a selected pixel 404, such as an embodiment in which the selected pixel 404 includes a reflector structure 908, the illumination light 316 reflected to and passed by the imaging optics 424 to an object point 228, and returned by the imaging optics 424 as reflected light 328, is received at the selected pixel 404.

Figure 10A:
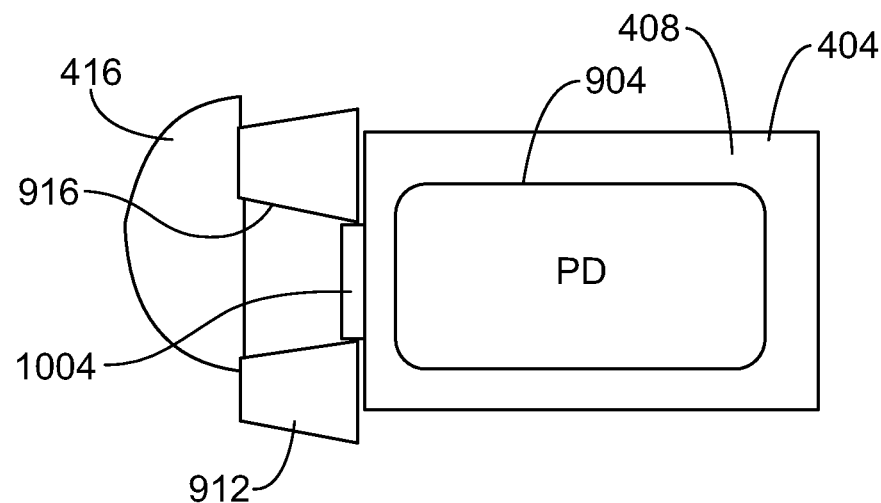
FIGS. 10A and 10B are cross sectional views of pixels incorporating a fluorescent material in accordance with embodiments of the present disclosure.
Figure 10B:
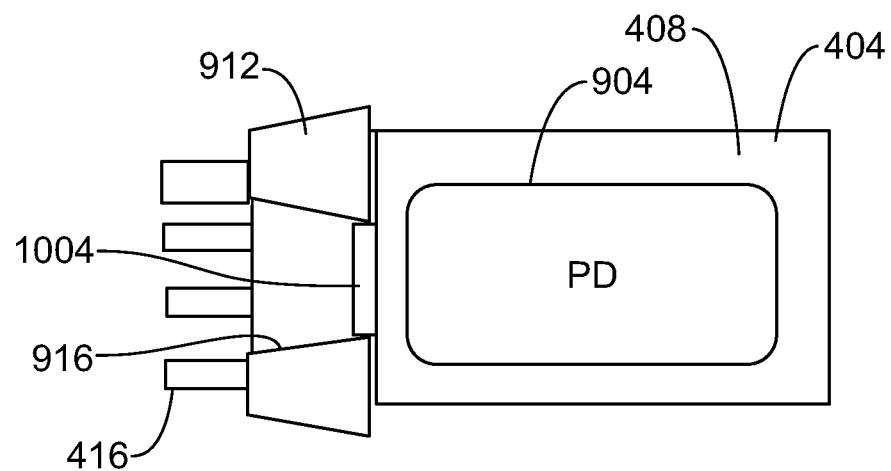

With reference now to FIGS. 10A and 10B, aspects of pixels 404 incorporating a fluorescent layer 1004 configured for operation in connection with embodiments of the present disclosure incorporating an integrated light source 428 having an output 432 adjacent to the pixel array 412 are depicted in cross-section views. As shown in the figures, the illustrated variants are the same, except that the pixel shown in FIG. 10A includes a refractive microlens 416, while the pixel shown in FIG. 10B includes a diffractive microlens 416. Otherwise, elements of the illustrated pixels 404 are the same or similar, and thus the following description will apply to both, unless otherwise indicated. The pixel 404 generally includes a photoelectric conversion structure 904 formed in the sensor substrate 40 that emits electrons in response to exposure to light.

The fluorescent layer 1004 is disposed on or adjacent a light receiving surface of the photoelectric conversion structure 904 formed in the sensor substrate 408. In general, the fluorescent layer 1004 includes a material that, in response to receiving illumination or excitation light 316*a* from a light source 428, reemits illumination light 316*b* that is provided to the imaging optics 324 and in turn is directed to the scene 100 as illumination light 316*c*.

The pixel 404 can additionally include an aperture structure 912 that is disposed adjacent the light receiving surface of the sensor substrate 408, and can define an aperture 916 that operates to limit the range of angles over which light 316 or 328 incident on the pixel 404 is received, and that can further define a range of angles over which illumination light 316 reemitted by the fluorescent layer 1004 is provided to the imaging optics 424. In accordance with at least some embodiments of the present disclosure, the fluorescent layer 1004 is disposed within the aperture 916. In accordance with other embodiments of the present disclosure, the fluorescent layer 1004 can be disposed between the aperture structure 912 and the light incident surface of the sensor substrate 408. As in other embodiments, the aperture structure 912 can be formed from a layer of metal or from a layer of low refractive index material disposed on the light incident side of the sensor substrate 408.

As in at least some other embodiments, the microlens 416 can be disposed across a light incident surface of the aperture structure 912. In addition, the microlens 416 location can be shifted relative to a centerline of the pixel 404, and/or the microlens 416 shape can be modified (e.g. in an elevation view a microlens 416 can have a thickness and curvature that is different than a microlens 416 associated with a pixel 404 in a different location of the pixel array 412), dependent on a particular location of the pixel 404 within the pixel array 412, to accommodate a specific chief ray angle. More particularly, the configuration of the microlens 416 and of the aperture 916 can be selected to ensure that illumination light 316 emitted by the fluorescent layer 1004 is provided to the imaging optics 424 within a selected cone or area. In addition, and as can be appreciated by one of skill in the art after consideration of the present disclosure, a system 104 in accordance with embodiments of the present disclosure enable a 1:1 correspondence between image points (points or pixels 404 within the pixel array 412) and object points 228. Accordingly, in embodiments in which illumination light 316 is emitted from a selected pixel 404, such as an embodiment in which the selected pixel 404 includes a fluorescent layer 1004, the illumination light 316 provided to and passed by the imaging optics 424 to an object point 228, and returned by the imaging optics 424 as reflected light 328, is received at the selected pixel 404.

Figure 11A:
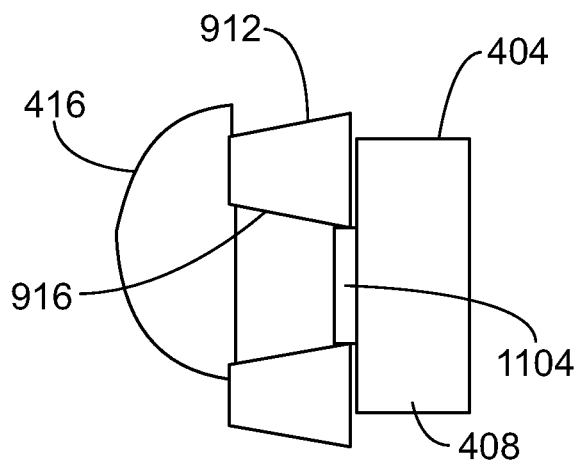
FIGS. 11A and 11B are cross sectional views of pixels incorporating a quantum dot material in accordance with other embodiments of the present disclosure.
Figure 11B:
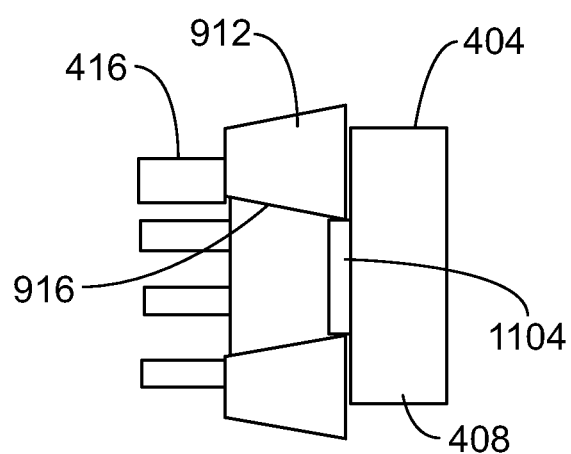

With reference now to FIGS. 11A and 11B, aspects of pixels 404 incorporating an electroluminescent quantum dot material 1104 that can be operated in a first or light emission mode and in a second or light detection mode are depicted in cross-section views. Pixels incorporating an electroluminescent quantum dot material 1104 can be applied in connection with various embodiments of the present disclosure, including those illustrated in connection with FIG. 6, in which illumination light 316 is produced at the pixel array 412. Accordingly, in such embodiments, the light source 428 is provided as part of the pixel array 412. As shown in the figures, the illustrated variants are the same, except that the pixel shown in FIG. 11A includes a refractive microlens 416, while the pixel shown in FIG. 11B includes a diffractive microlens 416. Otherwise, elements of the illustrated pixels 404 are the same or similar, and thus the following description will apply to both, unless otherwise indicated.

The quantum dot material 1104 is disposed on or adjacent a light receiving surface of the sensor substrate 408. As can be appreciated by one of skill in the art, the quantum dot material 1104 can be disposed between various layers and electrodes for operating the associated pixel 404 in either of an emission mode, in which a forward bias is applied to the quantum dot material 1104, or a detection mode, in which a reverse bias is applied to the quantum dot material 1104.

The pixel 404 can additionally include an aperture structure 912 that is disposed adjacent the light receiving surface of the sensor substrate 408, and can define an aperture 916 that operates to limit the range of angles over which light 316 or 328 incident on the pixel 404 is received, and that can further define a range of angles over which illumination light 316 reemitted by the fluorescent layer 1004 is provided to the imaging optics 424. In accordance with at least some embodiments of the present disclosure, the quantum dot layer 1104 is disposed within the aperture 916. In accordance with other embodiments of the present disclosure, the quantum dot layer 1104 can be disposed between the aperture structure 912 and the light incident surface of the sensor substrate 408. As in other embodiments, the aperture structure 912 can be formed from a layer of metal or from a layer of low refractive index material disposed on the light incident side of the sensor substrate 408.

Similar to or the same as at least some other embodiments of the present disclosure, the microlens 416 can be disposed across a light incident surface of the aperture structure 912. In addition, the microlens 416 location can be shifted relative to a centerline of the pixel 404, and/or the microlens 416 shape can be modified, dependent on a particular location of the pixel 404 within the pixel array 412, to accommodate a specific chief ray angle. More particularly, the configuration of the microlens 416 and of the aperture 916 can be selected to ensure that illumination light 316 emitted by the reflector structure 908 is provided to the imaging optics 424 within a selected cone or area. In addition, and as can be appreciated by one of skill in the art after consideration of the present disclosure, a system 104 in accordance with embodiments of the present disclosure enable a 1:1 correspondence between image points (points or pixels 404 within the pixel array 412) and object points 228. Accordingly, in embodiments in which illumination light 316 is emitted by a selected pixel 404, such as an embodiment in which the selected pixel 404 includes a quantum dot material 1104, the illumination light 316 reflected to and passed by the imaging optics 424 to an object point 228, and returned by the imaging optics 424 as reflected light 328, is received at the selected pixel 404.

Figure 12A:
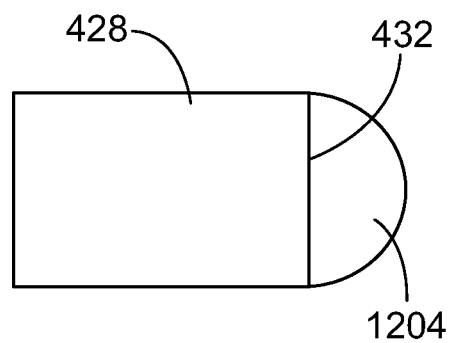
FIGS. 12A and 12B depict light source outputs in accordance with embodiments of the present disclosure.
Figure 12B:
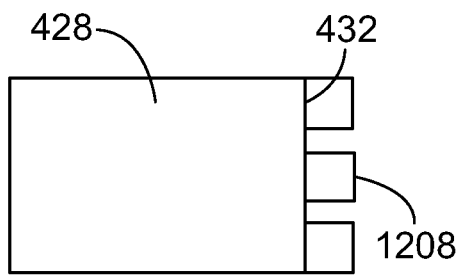

With reference now to FIGS. 12A and 12B, embodiments of an output 432 of a light source 428 in accordance with embodiments of the present disclosure are illustrated. As discussed elsewhere herein, the output 432 of the light source 428 may be part of or joined to the light source 428 itself, or may be part of or joined to an aperture, fiber optic element or elements or other conduit extending between the light source 428 and the imaging volume 440 of the imaging system 304. As shown in FIG. 12A, in at least some embodiments of the output 432 can include a dispersive lens element 1204. The dispersive lens element 1204 can be configured to provide illumination light 316 a from the light source 328 over all or most of the pixels 404 of the pixel array 412 evenly. As shown in FIG. 12B, other embodiments of the output 432 can include a diffractive lens element 1208. As depicted in the figure, the diffractive lens element 1208 can include a two-dimensional grating that provides illumination light 316a as structured light including beam spots that are provided to specific pixels 404 within the pixel array 412. In accordance with still other embodiments of the present disclosure, the output 432 can simply be the output and of an optical fiber or set of optical fibers having a large numerical aperture (small f-number) to deliver a large cone of light across the pixels 404 of the pixel array 412.

Figure 13:
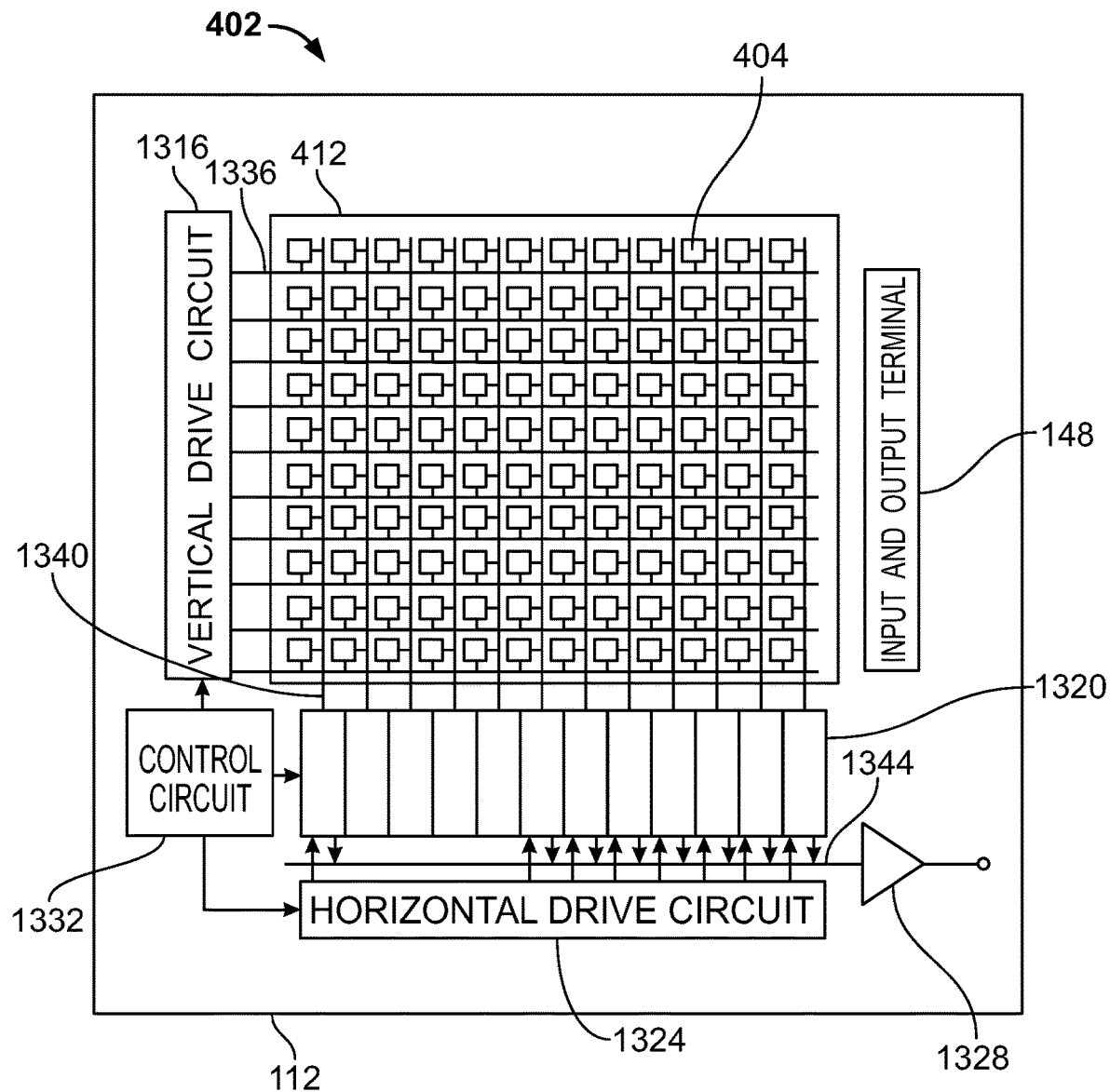
FIG. 13 is a diagram that depicts elements of an image sensor included in an imaging system in accordance with embodiments of the present disclosure.

FIG. 13 is a diagram that depicts elements of an image sensor or device 402 that can be included in an imaging system 304 in accordance with embodiments of the present disclosure. In general, the image sensor 402 includes a plurality of pixels 404 disposed in an array 412. More particularly, the pixels 404 can be disposed within an array 412 having a plurality of rows and columns of pixels 404. Moreover, the pixels 404 are formed in a sensor substrate 408. In addition, one or more peripheral or other circuits can be formed in connection with the sensor substrate 408. Examples of such circuits include a vertical drive circuit 1316, a column signal processing circuit 1320, a horizontal drive circuit 1324, an output circuit 1328, and a control circuit 1332.

The control circuit 1332 can receive data for instructing an input clock, an operation mode, and the like, and can output data such as internal information related to the image sensor 402. Accordingly, the control circuit 1332 can generate a clock signal that provides a standard for operation of the vertical drive circuit 1316, the column signal processing circuit 1320, and the horizontal drive circuit 1324, and control signals based on a vertical synchronization signal, a horizontal synchronization signal, and a master clock. The control circuit 1332 outputs the generated clock signal in the control signals to the various other circuits and components.

The vertical drive circuit 1316 can, for example, be configured with a shift register, can operate to select a pixel drive wiring 1336, and can supply pulses for driving pixels 404 through the selected drive wiring 1336 in units of a row. The vertical drive circuit 1316 can also selectively and sequentially scan elements of the array 412 in units of a row in a vertical direction, and supply the signals generated within the pixels 404 according to an amount of light they have received to the column signal processing circuit 1320 through a vertical signal line 1340.

The column signal processing circuit 1320 can operate to perform signal processing, such as noise removal, on the signal output from the pixels 404. For example, the column signal processing circuit 120 can perform signal processing such as a correlated double sampling (CDS) for removing a specific fixed patterned noise of a selected pixel 104 and an analog to digital (A/D) conversion of the signal.

The horizontal drive circuit 1324 can include a shift register. The horizontal drive circuit 1324 can select each column signal processing circuit 1320 in order by sequentially outputting horizontal scanning pulses, causing each column signal processing circuit 1322 to output a pixel signal to a horizontal signal line 1344.

The output circuit 1328 can perform predetermined signal processing with respect to the signals sequentially supplied from each column signal processing circuit 1320 through the horizontal signal line 1344. For example, the output circuit 1328 can perform a buffering, black level adjustment, column variation correction, various digital signal processing, and other signal processing procedures. An input and output terminal 148 exchanges signals between the image sensor 402 and external components or systems.

Accordingly, at least portions of a color sensing image sensor 402 in accordance with at least some embodiments of the present disclosure can be configured as a CMOS image sensor of a column A/D type in which column signal processing is performed.

Figure 14:
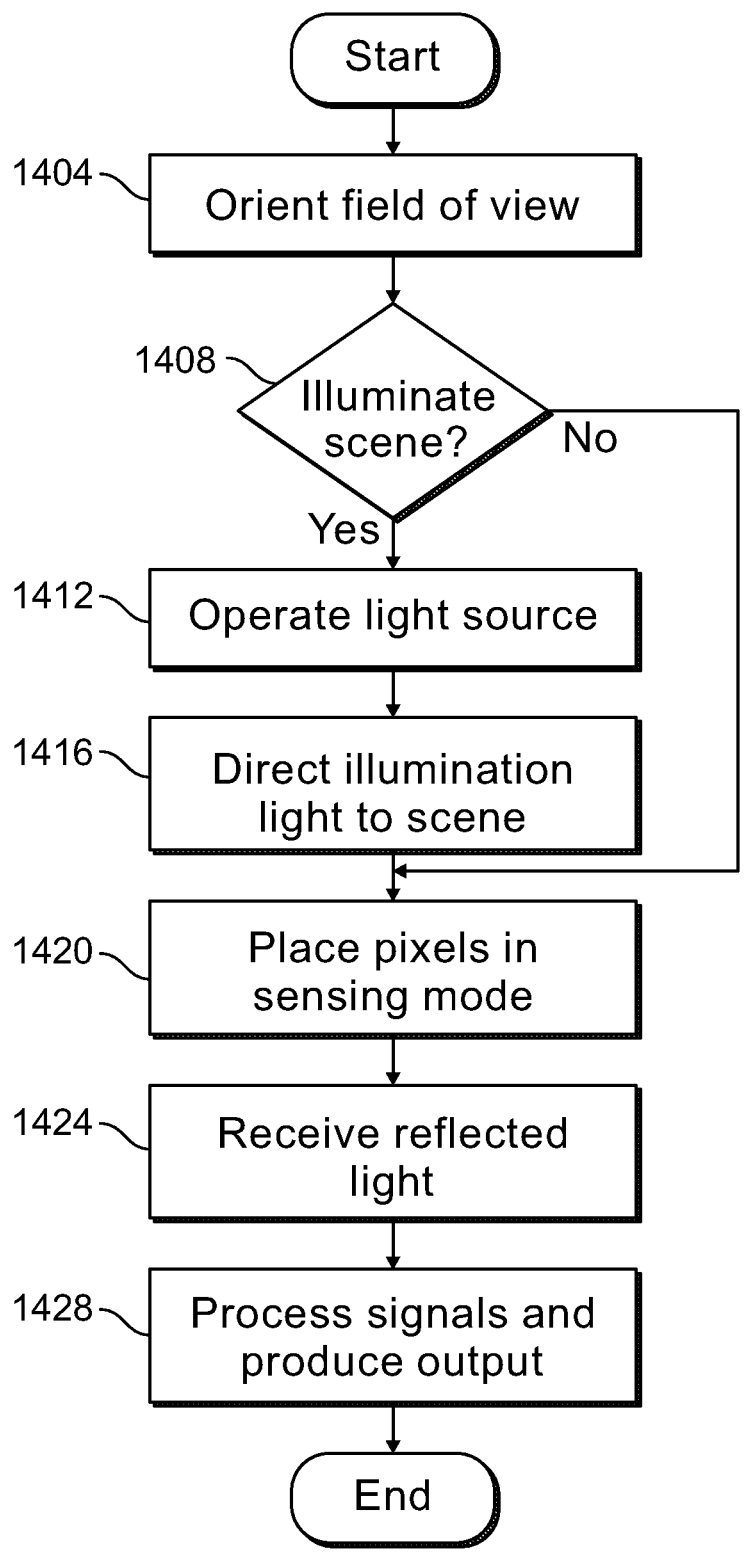
FIG. 14 depicts aspects of a process for illuminating a scene in accordance with embodiments of the present disclosure.

FIG. 14 depicts aspects of a process for illuminating a scene 100 in accordance with embodiments of the present disclosure. Initially, at step 1404, an imaging system 304 having an integrated light source 428 is positioned such that a field of view 324 of the imaging system 304 encompasses a selected area of a scene 100. A determination may then be made as to whether illumination light 316 is required or desired in connection with obtaining an image of the scene 100 (step 1408). If illumination light 316 is required or desired, the light source 428 is operated to generate illumination light 316 (step 1412). The specifics according to which the light source 428 generates the illumination light 316 depend on the particular embodiment of the imaging system 304. For example, in connection with an imaging system 304 incorporating an image sensor 402 having pixels 404 that include a reflector structure 908, the light source 428 can be operated to produce illumination light 316a that is provided across (e.g. through a dispersive lens at an output 432 of the light source 428) some or all of the pixels 404 in the pixel array 412, or that is directed to some or all of the pixels 404 and the pixel array 412 as structured light 316a). As another example, in connection with an imaging system 304 incorporating an image sensor 402 having pixels 404 that include a fluorescent layer 1004 or a photoluminescent quantum dot material, the light source 428 can be operated to generate excitation light 316a that is provided to pixels 404 within the pixel array 412, and in response the pixels 404 re-emit or emit illumination light 316b. As yet another example, for an imaging system 304 incorporating an image sensor 402 having pixels 404 that themselves operate to generate illumination light 316, and thus that incorporate the light source 428 into the pixel array 412, such as light-emitting diode pixels or pixels incorporating an electroluminescent quantum dot material, some or all of such pixels 404 can be operated to emit illumination light 316b. In accordance with embodiments of the present disclosure, illumination light 316 can be provided across the entire field of view 324 of the imaging system 304 by reflecting light from or producing light at all of the pixels 404 within the pixel array 412. In accordance with other embodiments of the present disclosure, pixels 404 at selected points are within selected areas of the pixel array 412 can be used to reflect or produce illumination light 316. In addition, due to the one-to-one correspondence between image points (corresponding to individual pixels 404 within the pixel array 412) and object points 228 within the scene 100 provided by at least some embodiments of the present disclosure, light reflected by or emitted from a selected pixel 404 that is reflected from an object point 228 is received at the originating pixel 404. Due to this conjunctive property, selected pixels 404 or groups of pixels 404 can be operated to illuminate selected objects 108 or areas within a scene 100.

At step 1416, the illumination light 316 is directed to the scene 100. More particularly, the light reflected or provided from the pixels 404 is passed to the imaging optics 424, and on to at least some portions of the scene 100 encompassed by the field of view 324 of the imaging system 304. After the illumination light 316 has been reflected or emitted from the pixels 404, the pixels 404 within the sensor array 412 are placed in a sensing mode (step 1420). Light reflected 328 from objects 108 within the scene 100 is then collected by the imaging optics 424, and passed back to the pixel array 412 (step 1424). More particularly, and as mentioned elsewhere herein, due to the conjugate nature of an imaging system 304 in accordance with embodiments of the present disclosure, illumination light 316 reflected by or emitted from a selected pixel 404 that is reflected from an object 108 within the scene 100 and received at the imaging system 304 as reflected light will be incident on that selected pixel 404. Image information collected by the pixels can then be processed and applied to produce an output (step 1428). The process may then end.

Figure 15:
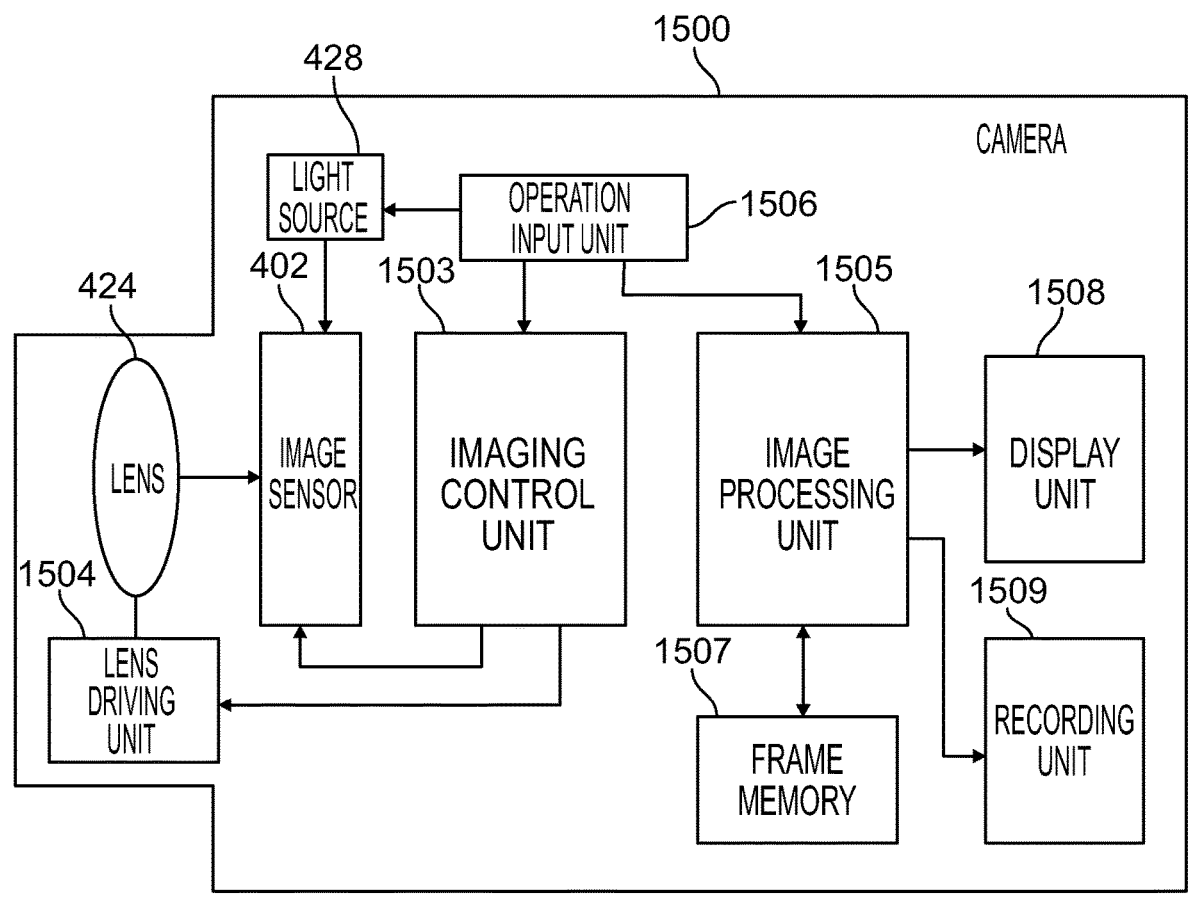
FIG. 15 is a block diagram illustrating a schematic configuration example of a camera that is an example of a device including an image sensor in accordance with embodiments of the present disclosure.

FIG. 15 is a block diagram depicting a schematic configuration of a camera 1500 as an example of an embodiment of an imaging system 304 incorporating an integrated illumination light source 428 in accordance with embodiments of the present disclosure. As depicted in the figure, the camera 1500 includes a light source 428, imaging optics 424, an image sensor 402, an imaging control unit 1503, a lens driving unit 1504, an image processing unit 1505, an operation input unit 1506, a frame memory 1507, a display unit 1508, and a recording unit 1509.

The imaging optics 424 include an objective lens of the camera. In accordance with embodiments of the present disclosure, the imaging optics 424 operate to project illumination light produced by the light source 428 to an area encompassing some or all of a field of view 324 of the imaging system 304. In addition, the imaging optics 424 collect light from within a field of view 324 of the camera 1500, which can encompass a scene 100 containing an object 108. As can be appreciated by one of skill in the art after consideration of the present disclosure, the field of view 324 is determined by various parameters, including a focal length of the lens, the size of the effective area of the image sensor 402, and the distance of the image sensor 402 from the lens. In addition to a lens, the imaging optics 424 can include other components, such as a variable aperture and a mechanical shutter. The imaging optics 424 direct the collected light, which can include light originally provided to the scene 100 as illumination light 316 and that is reflected from an object 108 within the scene 100, to the image sensor 402 to form an image of the object 108 on a light incident surface of the image sensor 402.

As discussed elsewhere herein, the image sensor 402 includes a plurality of pixels 404 disposed in an array 412. Moreover, the image sensor 402 can include a semiconductor element or substrate 408 in which the pixels 404 are formed as photosensitive areas or photodiodes within the substrate 112. In accordance with other embodiments, the image sensor 402 can include photosensitive pixels 404a, and light-emitting pixels 404b. In accordance with still other embodiments of the present disclosure, the image sensor 402 can include pixels 404 incorporating a quantum dot material that can be operated to emit or sense light. When the imaging system 304 is operated to generate illumination light 316, the included pixels 404 can be used to reflect or emit that illumination light 316. When the imaging system 304 is operated to collect image information, the included pixels 404 are operated to generate charge in response to received light, and more particularly to generate analog signals that are proportional to an amount of light incident thereon. These analog signals can be converted into digital signals in a circuit, such as a column signal processing circuit 1320, included as part of the image sensor 402, or in a separate circuit or processor. The digital signals can then be output.

The imaging control unit 1503 controls imaging operations of the image sensor 402 by generating and outputting control signals to the light source 428 and the image sensor 402. Further, the imaging control unit 1503 can perform autofocus in the camera 1500 and can adjust the position of the lens through the lens driving unit 1504 on the basis of the detected focus position, to thereby perform autofocus. Note that, the imaging control unit 1503 can include, for example, a DSP (Digital Signal Processor) equipped with firmware.

The lens driving unit 1504 drives the imaging optics 424 on the basis of control of the imaging control unit 1503. The lens driving unit 1504 can drive the imaging optics 424 by changing the position of included lens elements using a built-in motor.

The image processing unit 1505 processes image signals generated by the image sensor 402. This processing includes, for example, determining an amplitude of the pixel 404 signals intensities. The image processing unit 1505 can include, for example, a microcomputer equipped with firmware, and/or a processor that executes application programming, to implement processes for identifying color information in collected image information as described herein.

The operation input unit 1506 receives operation inputs from a user of the camera. As the operation input unit 1506, for example, a push button or a touch panel can be used. An operation input received by the operation input unit 1506 is transmitted to the imaging control unit 1503 and the image processing unit 1505. After that, processing corresponding to the operation input, for example, the collection and processing of imaging an object or the like, is started.

The frame memory 1507 is a memory configured to store frames that are image signals for one screen or frame of image data. The frame memory 1507 is controlled by the image processing unit 1505 and holds frames in the course of image processing.

The display unit 1508 can display information processed by the image processing unit 1505. For example, a liquid crystal panel can be used as the display unit 1508.

The recording unit 1509 records image data processed by the image processing unit 1505. As the recording unit 1509, for example, a memory card or a hard disk can be used.

Note that, although a camera has been described as an example of an imaging system 304 incorporating an image sensor 402 and an integrated light source 428, and other components, such as processors and memory for executing programming or instructions and for storing calibration information as described herein, can be incorporated into other types of devices. Such devices include, but are not limited to, surveillance systems, automotive sensors, scientific instruments, medical instruments, ranging systems, etc.

As can be appreciated by one of skill in the art after consideration of the present disclosure, an image sensor 402 as disclosed herein includes an integrated illumination or light source 428. Illumination light generated by or in connection with the light source 428 is passed through imaging optics two areas of a scene within a field of view of the imaging system 304. Light reflected from objects 108 within the scene 100 is collected by the imaging optics, and sensed by pixels disposed within a pixel array 412. Accordingly, illumination light can be used more efficiently as compared to various prior art systems by confining the illumination light 316 to within the field of view 324 of the imaging system 304. Moreover, due to the conjugate nature of the imaging optics 424, a one-to-one correspondence between an image point, corresponding to a pixel 404 within the pixel array 412, and a point or area 128 of an object 108 is achieved.

Although various embodiments discussed herein have included an image sensor 402 having an array of pixels 412 operated to obtain image information, embodiments of the present disclosure are not so limited. For example, an image sensor 402 having an integrated light source 428 as discussed herein can have a single pixel 404, or a relatively small number of pixels, for example for use in connection with a light based ranging system. As another example, embodiments of the present disclosure can be provided as part of a three dimensional imaging system or light detection and ranging system. In accordance with still other embodiments, the image sensor 402 can include a pixel array 412 having a number of pixels that are operated in modes other than conventional imaging modes, for example as in certain scientific instruments and machine vision applications.

The foregoing has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
outputting illumination light towards one or more pixels of an image sensor, wherein the illumination light reflects off the one or more pixels, passes through an imaging optics and towards an object, and is reflected off the object as reflected light, and wherein at least some of the reflected light passes through the imaging optics; and
receiving at least some of the reflected light passing through the imaging optics with the image sensor.

2. The method of claim 1, wherein the illumination light is generated by a light source adjacent to the pixels of the image sensor.

3. The method of claim 2, wherein the light source is disposed within an imaging volume of the image sensor.

4. The method of claim 1, wherein the illumination light is directed to the one or more pixels of the image sensor by an optical fiber.

5. The method of claim 4, wherein an output end of the optical fiber is disposed within an imaging volume of the image sensor, and wherein an input end of the optical fiber receives the illumination light from a light source located outside the imaging volume of the image sensor.

6. The method of claim 1, wherein the illumination light is provided to fewer than all of the pixels of the image sensor.

7. The method of claim 1, wherein the pixels are disposed in an array, and wherein the illumination light is generated by elements within the array.

8. The method of claim 1, further comprising:
determining an amount of elapsed time between outputting the illumination light and receiving at least some of the reflected light to determine a range to the object.

9. The method of claim 1, further comprising:
generating a charge in response to the reflected light; and
forming an image based on the generated charge.

10. A sensor system, comprising:
a sensor, including:
a sensor substrate;
a plurality of pixels formed in the sensor substrate and disposed in an array; and
a light source, wherein an output of the light source is located adjacent to or within the array of pixels; and
imaging optics, wherein light from the light source towards one or more pixels of the plurality of pixels reflects off the one or more pixels, passes through the imaging optics and towards an object, and is reflected off the object as reflected light, and wherein at least some of the reflected light passes through the imaging optics and is received at the one or more pixels.

11. The sensor system of claim 10, wherein the light source is located within an imaging volume.

12. The sensor system of claim 11, further comprising:
a cover glass, wherein the cover glass is positioned between the imaging optics and the plurality of pixels.

13. The sensor system of claim 12, further comprising:
an image sensor package, wherein the sensor is an image sensor, wherein the image sensor package, the cover glass, and the sensor substrate define an imaging volume, and wherein the light source is located within the imaging volume.

14. The sensor system of claim 11, wherein an output of the light source is directed towards at least some of the pixels included in the plurality of pixels.

15. The sensor system of claim 14, wherein the light source includes a diffractive lens element.

16. The sensor system of claim 14, wherein the one or more pixels include reflectors configured to reflect light received from the output of the light source to the imaging optics.

17. The sensor system of claim 15, wherein at least some of the pixels include an electroluminescent, a photoluminescent material, or both an electroluminescent and a photoluminescent material.

18. The sensor system of claim 11, wherein the light source is located outside of a sensor substrate package, wherein the light source is operatively connected to a first end of an optical fiber, and wherein the output of the light source is a second end of the optical fiber.

19. The sensor system of claim 10, wherein the light source comprises pixels included in the plurality of pixels that are configured to output illumination light.

20. An image sensor, comprising:
a sensor substrate;
a plurality of pixels formed in the sensor substrate;
an image sensor package;
a cover glass; and
a light source, wherein an output of the light source is disposed within an imaging volume defined by the sensor substrate, the image sensor package, and the cover glass, wherein light from the light source towards one or more pixels of the plurality of pixels reflects off the one or more pixels towards an object and is reflected off the object as reflected light, and wherein at least some of the reflected light is received at the one or more pixels.

* * * * *